United States Patent
Dabby

(10) Patent No.: US 11,024,276 B1
(45) Date of Patent: Jun. 1, 2021

(54) METHOD OF CREATING MUSICAL COMPOSITIONS AND OTHER SYMBOLIC SEQUENCES BY ARTIFICIAL INTELLIGENCE

(71) Applicant: Diana Dabby, Somerville, MA (US)

(72) Inventor: Diana Dabby, Somerville, MA (US)

( * ) Notice: Subject to any disclaimer, the term of this patent is extended or adjusted under 35 U.S.C. 154(b) by 0 days.

(21) Appl. No.: 16/802,983

(22) Filed: Feb. 27, 2020

Related U.S. Application Data

(63) Continuation-in-part of application No. 16/144,521, filed on Sep. 27, 2018, now Pat. No. 10,614,785.

(60) Provisional application No. 62/563,669, filed on Sep. 27, 2017.

(51) Int. Cl.
  *G10H 1/00* (2006.01)
  *G06N 20/00* (2019.01)

(52) U.S. Cl.
  CPC .......... *G10H 1/0025* (2013.01); *G06N 20/00* (2019.01); *G10H 2210/061* (2013.01); *G10H 2210/105* (2013.01); *G10H 2210/111* (2013.01); *G10H 2210/151* (2013.01)

(58) Field of Classification Search
  CPC .......... G10H 1/0025; G10H 2210/111; G10H 2210/151; G10H 2210/105; G10H 2210/061; G10H 1/0008; G10H 7/02; G10H 2210/076; G10H 2210/131; G06N 20/00
  See application file for complete search history.

(56) References Cited

U.S. PATENT DOCUMENTS

| | | | |
|---|---|---|---|
| 5,003,860 | A | 4/1991 | Minamitaka |
| 5,281,754 | A | 1/1994 | Farrett et al. |
| 5,331,112 | A | 7/1994 | Sato et al. |
| 5,371,854 | A | 12/1994 | Kramer |
| 5,418,323 | A | 5/1995 | Kohonen |
| 5,606,144 | A | 2/1997 | Dabby |
| 5,736,663 | A | 4/1998 | Aoki et al. |
| 6,028,262 | A | 2/2000 | Minamitaka |
| 6,137,045 | A | 10/2000 | Short et al. |

(Continued)

OTHER PUBLICATIONS

Lorenz, E.N., Deterministic nonperiodic flow, J. Atmos. Sci., 1963, vol. 20, pp. 130-141.

(Continued)

*Primary Examiner* — Jeffrey Donels
(74) *Attorney, Agent, or Firm* — Maine Cernota & Rardin

(57) ABSTRACT

A method of creating AI-composed music having a style that reflects and/or augments the personal style of a user includes selecting and/or composing one or more seed compositions; applying variation and/or mash-up methods to the seed compositions to create training data; training an AI using the training data; and causing the AI to compose novel musical compositions. The variation methods can include methods described in the inventor's previous patents. A novel method of creating mash-ups is described herein. Variation and mash-up methods can further be applied to the A compositions. The AI compositions, and/or variations and/or mash-ups thereof, can be added to the training data for re-training of the AI. The disclosed mash-up method includes parsing the seed compositions into sequences of elements, which can be of equal length, beat-matching the seed compositions to make corresponding elements of equal beat length, and combining the elements to form a mash-up.

20 Claims, 19 Drawing Sheets

(56) References Cited

U.S. PATENT DOCUMENTS

| | | | |
|---|---|---|---|
| 6,150,597 | A | 11/2000 | Kakishita et al. |
| 6,177,624 | B1 | 6/2001 | Takahashi et al. |
| 6,245,984 | B1 | 6/2001 | Aoki et al. |
| 6,395,970 | B2 | 5/2002 | Aoki |
| 6,741,264 | B1 | 5/2004 | Lesser |
| 7,034,217 | B2 | 4/2006 | Pachet |
| 7,135,635 | B2 | 11/2006 | Childs, Jr. et al. |
| 7,193,148 | B2 | 3/2007 | Cremer et al. |
| 7,342,166 | B2 | 3/2008 | Kay |
| 7,498,504 | B2 | 3/2009 | Bourgeios |
| 7,541,534 | B2 | 6/2009 | Schnepel et al. |
| 7,560,636 | B2 | 7/2009 | Wolfram |
| 7,612,279 | B1 | 11/2009 | Schnepel et al. |
| 7,629,528 | B2 | 12/2009 | Childs, Jr. et al. |
| 7,674,966 | B1 | 3/2010 | Pierce |
| 7,728,212 | B2 | 6/2010 | Fujishima et al. |
| 7,840,608 | B2 | 11/2010 | Kurzweil et al. |
| 7,948,981 | B1 | 5/2011 | Schnepel et al. |
| 8,035,022 | B2 | 10/2011 | Wolfram |
| 8,357,847 | B2 | 1/2013 | Huet et al. |
| 9,286,876 | B1 | 3/2016 | Dabby |
| 9,286,877 | B1 | 3/2016 | Dabby |
| 2008/0127812 | A1* | 6/2008 | Sako .................. G11B 27/036 84/625 |
| 2010/0064882 | A1* | 3/2010 | Miyajima ............ G11B 27/034 84/625 |
| 2010/0186579 | A1* | 7/2010 | Schnitman ........... G10H 1/0025 84/625 |
| 2014/0095978 | A1* | 4/2014 | Chang .................. G06F 16/958 715/234 |
| 2014/0355789 | A1* | 12/2014 | Bohrarper ........... H04N 21/4661 381/119 |

OTHER PUBLICATIONS

Dabby, D.S., Musical Variations from a Chaotic Mapping, 1995 MIT doctoral thesis, 162 pgs.

Dabby, D.S., Musical Variations from a Chaotic Mapping, Chaos, 1996, 13 pgs.

Dabby, D.S. Dabby, A chaotic mapping for music and image variations, Proc. Fourth Int'l. Chaos Conference, 1998, 12 pgs.

Dabby, D.S. Dabby, Creating Musical Variation, Science, 2008, 2 pgs.

Carabias-Orti, J. J. et al., Music Scene-Adaptive Harmonic Dictionary for Unsupervised Note-Event Detection, IEEE Transactions on Audio, Speech, and Language Processing 18 (3), 2010, pp. 473-486.

U.S. Pat. No. Re. 40,543 E—Reissue of U.S. Pat. No. 5,736,663 on Oct. 21, 2008, Patentee is Aoki et al, 36 pages.

U.S. Appl. No. 16/144,521 dtd Sep. 27, 2018, Applicant is Diana Dabby (Unpublished).

* cited by examiner

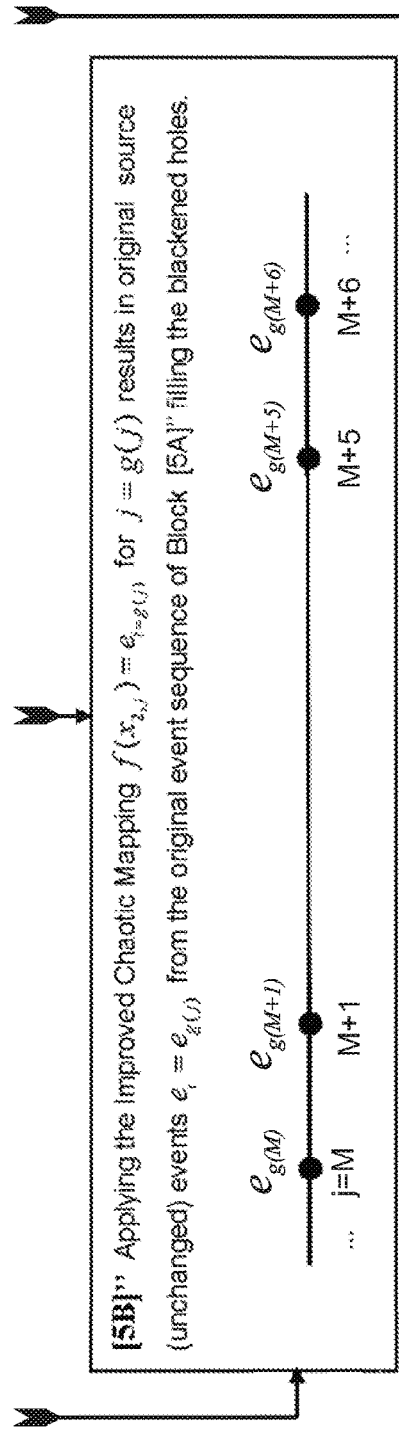
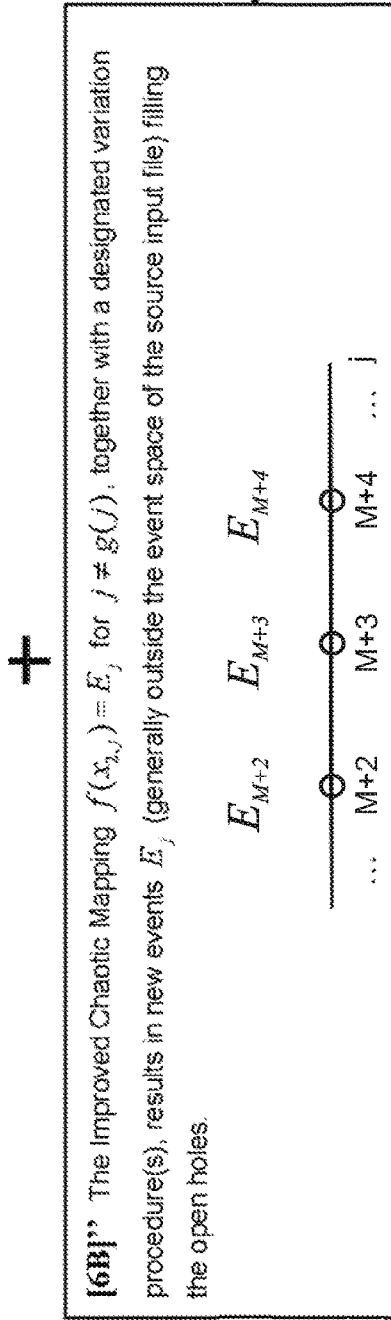
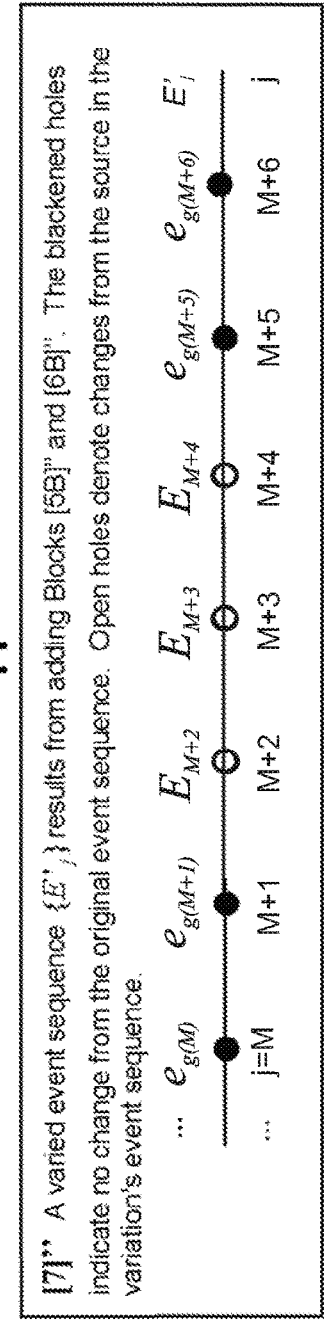
Figure 1B (Continued) Prior Art

| Opening Block | Block 1 | Block 2 | Block 3 | Block 4 | 500 |
|---|---|---|---|---|---|
| | | | VocA 8-quarters | VocA 8-quarters | |
| | VocB 8-quarters | VocB 8-quarters | VocB 8-quarters | VocB 8-quarters | |
| InstA 8-quarters (more/less quarters possible) | InstA 8-quarters | InstA 8-quarters | InstA 8-quarters | InstA 8-quarters | |
| | | | | InstB 8-quarters | |

| Block 5 | Block 6 | Block 7 | Block 8 | 502 |
|---|---|---|---|---|
| VocA | VocA | VocA | VocA | |
| | | VocB | VocB | |
| | | | | |
| InstB | InstB | InstB | InstB | |

| Block 9 | Block 10 | Block 11 | Block 12 | Block 13 | Block 14 | 504 |
|---|---|---|---|---|---|---|
| | | | | VocA | VocA | |
| VocB | VocB | VocB | VocB | VocB | VocB | |
| | | InstA | InstA | InstA | InstA | |
| InstB | InstB | | | | | |

| Block 15 | Block 16 | Block 17 | Block 18 | Block 19 | Block 20 | 506 |
|---|---|---|---|---|---|---|
| VocA | VocA | VocA | VocA | VocA | VocA | |
| VocB | VocB | VocB | VocB | | | |
| | | InstA | InstA | InstA | InstA | |
| | | | | | | |

| Block 21 | Block 22 | Block 23 | Block 24 | Block 25 | Block 26 | 508 |
|---|---|---|---|---|---|---|
| VocA | VocA | VocA | VocA | VocA | VocA | |
| | | | | VocB | VocB | |
| InstA | InstA | | | | | |
| | | InstB | InstB | InstB | InstB | |

| Block 27 | Block 28, ..., Final Block | 510 |
|---|---|---|
| VocA | Apply coda or continue track combinations till desired end | |
| VocB | Apply coda or continue track combinations till desired end | |
| InstA | Apply coda or continue track combinations till desired end | |
| InstB | Apply coda or continue track combinations till desired end | |

Figure 5A

| Measure 1 of mashup | | m. 2 of mashup | | [ ... ] |
|---|---|---|---|---|
| vocB silence | \|vocB upbeat | Downbeat of vocB | \|upbeat to m. 3 | [ ... ] |

| Downbeat of instA | | Downbeat of instA | [ ... ] |
|---|---|---|---|

Figure 5B

| Opening Block | Block 1 | Block 2 | Block 3 | Block 4 | 600 |
|---|---|---|---|---|---|
| | | | VocA | VocA | |
| | VocB 8 quarters | VocB | VocB | VocB | |
| InstA 8 quarters (more/less quarters possible) | InstA 8 quarters | InstA | InstA | InstA | |
| | | | | InstB | |

| Block 5 | Block 6 | Block 7 | Block 8 | 602 |
|---|---|---|---|---|
| VocA | VocA | VocA | VocA | |
| | | VocB | VocB | |
| | | | | |
| InstB | InstB | InstB | InstB | |

| Block 9 | Block 10 | Block 11 | Block 12 | Block 13 | Block 14 | 604 |
|---|---|---|---|---|---|---|
| | | | | VocA | VocA | |
| VocB | VocB | VocB | VocB | VocB | VocB | |
| | | InstA | InstA | InstA | InstA | |
| InstB | InstB | | | | | |

| Block 15 | Block 16 | Block 17 | Block 18 | Block 19 | Block 20 | 606 |
|---|---|---|---|---|---|---|
| VocA | VocA | [rm VocA] | [rm VocA] | VocA | VocA | |
| VocB | VocB | VocB | VocB | | | |
| | | InstA | InstA | InstA | InstA | |
| | | | | | | |

| Block 21 | Block 22 | Block 23 | Block 24 | Block 25 | Block 26 | 608 |
|---|---|---|---|---|---|---|
| VocA | VocA | VocA | VocA | VocA | VocA | |
| | | | | VocB | VocB | |
| InstA | InstA | | | | | |
| [add] InstB | [add] InstB | InstB | InstB | InstB | InstB | |

| Block 27 | Blocks 28, ..., Final Block | 610 |
|---|---|---|
| VocA | Apply coda or continue track combinations till desired end | |
| VocB | Apply coda or continue track combinations till desired end | |
| InstA | Apply coda or continue track combinations till desired end | |
| InstB | Apply coda or continue track combinations till desired end | |

Figure 6A

| Eliminate instA parses prior to the instA Parse 1 | instA Parse 1 = new start parse for instA | instA Parse 2 = parse that follows the new start parse | instA Parse 3 = parse during which vocB enters | [ … ] |
|---|---|---|---|---|
| | MU Parse 1 | MU Parse 2 | MU Parse 3 | [ … ] |

Figure 6B

| Opening Block | Block 1 | Block 2 | Block 3 | Block 4 |
|---|---|---|---|---|
|  |  |  | vocA | vocA |
|  | vocB 8 quarters | vocB | vocB | vocB |
| instA 8 quarters (more/less quarters possible) | instA 8 quarters | instA | instA | instA |
|  |  |  |  | instB |

| Block 5 | Block 6 | Block 7 | Block 8 |
|---|---|---|---|
| vocA | vocA | vocA | vocA |
|  |  | vocB | vocB |
|  |  |  |  |
| instB | instB | instB | instB |

| Block 9 | Block 10 | Block 11 | Block 12 | Block 13 | Block 14 |
|---|---|---|---|---|---|
|  |  |  |  | vocA | vocA |
| vocB | vocB | vocB | vocB | vocB | vocB |
|  |  | instA | instA | instA | instA |
| instB | instB |  |  |  |  |

Figure 7

| Block 15 | Block 16 | Block 17 | Block 18 | Block 19 | Block 20 |
|---|---|---|---|---|---|
| vocA | vocA | vocA | vocA | vocA | vocA |
| vocB | vocB | [rm vocB] | [rm vocB] | | |
| | | [rm instA] | [rm instA] | instA | instA |
| | | instB | instB | instB | instB |

| Block 21 | Block 22 | Block 23 | Block 24 | Block 25 | Block 26 |
|---|---|---|---|---|---|
| [rm vocA] | [rm vocA] | [rm vocA] | [rm vocA] | vocA | vocA |
| vocB | vocB | vocB | vocB | vocB | vocB |
| instA | instA | instA | instA | | |
| [rm instB] | [rm instB] | instB | instB | instB | instB |

| Block 27 | Block 28, ..., end of MU song. |
|---|---|
| vocA | APPLY CODA or continue track combinations till desired end |
| Bvoc | APPLY CODA or continue track combinations till desired end |
| instA | APPLY CODA or continue track combinations till desired end |
| instB | APPLY CODA or continue track combinations till desired end |

Figure 7 (Continued)

Option 1A

| Block 0 | Block 1 | Block 2 | Block 3 | Block 4 |
|---|---|---|---|---|
| | vocB 8 quarters | vocB | vocA | vocA |
| | instA 8 quarters | instA | vocB | vocB |
| instA 8 (±) quarters | | | instA | instA |
| | | | | instB |

Option 1B

| Block 0 | Block 1 | Block 2 | Block 3 | Block 4 |
|---|---|---|---|---|
| | vocB 8 quarters | vocB | | vocA |
| | instA 8 quarters | instA | vocB | vocB |
| instA 8 (±) quarters | | | instA | instA |
| | | | instB | instB |

Option 2A

| Block 0 | Block 1 | Block 2 | Block 3 | Block 4 |
|---|---|---|---|---|
| | vocA 8 quarters | vocA | vocA | vocA |
| | | | vocB | vocB |
| instB 8 (±) quarters | instB 8 quarters | instB | instB | instA |
| | | | | instB |

Option 2B

| Block 0 | Block 1 | Block 2 | Block 3 | Block 4 |
|---|---|---|---|---|
| | vocA 8 quarters | vocA | vocA | vocA |
| | | | | vocB |
| instB 8 (±) quarters | instB 8 quarters | instB | instA | instA |
| | | | instB | instB |

Figure 8A

| Blocks 5-6 | LH option, i.e., j vs g(j) = 010, 001, 100, or 000 | RH option, i.e., j vs g(j) = 011, 101, 111, or 110 |
|---|---|---|
| | vocA | |
| | | vocB |
| | | instA |
| | instB | |

| Blocks 7-8 | LH option, i.e., j vs g(j) = 010, 001, 100, or 000 | RH option, i.e., j vs g(j) = 011, 101, 111, or 110 |
|---|---|---|
| | vocA | |
| | | vocB |
| | instA | instA |
| | instB | instB |

| Blocks 9-10 | LH option, i.e., j vs g(j) = 010, 001, 100, or 000 | RH option, i.e., j vs g(j) = 011, 101, 111, or 110 |
|---|---|---|
| | | vocA |
| | vocB | |
| | instA | |
| | | instB |

| Blocks 11-12 | LH option, i.e., j vs g(j) = 010, 001, 100, or 000 | RH option, i.e., j vs g(j) = 011, 101, 111, or 110 |
|---|---|---|
| | | vocA |
| | vocB | |
| | instA | instA |
| | instB | instB |

| Blocks 13-14 | LH option, i.e., j vs g(j) = 010, 001, 100, or 000 | RH option, i.e., j vs g(j) = 011, 101, 111, or 110 |
|---|---|---|
| | vocA | |
| | | vocB |
| | instA | |
| | | instB |

Figure 8B

| Blocks 15-16 | LH option, i.e., j vs g(j) = 010, 001, 100, or 000 | RH option, i.e., j vs g(j) = 011, 101, 111, or 110 |
|---|---|---|
| | vocA | vocA |
| | vocB | vocB |
| | instA | |
| | | instB |

| Blocks 17-18 | LH option, i.e., j vs g(j) = 010, 001, 100, or 000 | RH option, i.e., j vs g(j) = 011, 101, 111, or 110 |
|---|---|---|
| | | vocA |
| | vocB | |
| | | instA |
| | instB | |

| Blocks 19-20 | LH option, i.e., j vs g(j) = 010, 001, 100, or 000 | RH option, i.e., j vs g(j) = 011, 101, 111, or 110 |
|---|---|---|
| | | vocA |
| | vocB | |
| | instA | instA |
| | instB | instB |

| Blocks 21-22 | LH option, i.e., j vs g(j) = 010, 001, 100, or 000 | RH option, i.e., j vs g(j) = 011, 101, 111, or 110 |
|---|---|---|
| | vocA | |
| | | vocB |
| | instA | |
| | | instB |

Figure 8B (Continued)

| Blocks 23-24 | LH option, i.e., j vs g(j) = 010, 001, 100, or 000 | RH option, i.e., j vs g(j) = 011, 101, 111, or 110 |
|---|---|---|
| | vocA | instA |
| | vocB | instB |
| | | |
| | | |

| Blocks 25-26 | LH option, i.e., j vs g(j) = 010, 001, 100, or 000 | RH option, i.e., j vs g(j) = 011, 101, 111, or 110 |
|---|---|---|
| | | vocA |
| | vocB | |
| | instA | |
| | | instB |

| Blocks 27-28 | LH option, i.e., j vs g(j) = 010, 001, 100, or 000 | RH option, i.e., j vs g(j) = 011, 101, 111, or 110 |
|---|---|---|
| | | vocA |
| | vocB | |
| | instA | instA |
| | instB | instB |

| Block 29 ONLY (8 quarters long) | LH option, i.e., j vs g(j) = 010, 001, 100, or 000 | RH option, i.e., j vs g(j) = 011, 101, 111, or 110 |
|---|---|---|
| | vocA | vocA |
| | vocB | vocB |
| | instA | instA |
| | instB | instB |

| Blocks 30-31 (CODA begins) | LH option, i.e., j vs g(j) = 010, 001, 100, or 000 | RH option, i.e., j vs g(j) = 011, 101, 111, or 110 |
|---|---|---|
| | vocA | |
| | | vocB |
| | instA | instA |
| | instB | instB |

Figure 8B (Continued)

| Blocks 32-33 (CODA continues) | LH option, i.e., j vs g(j) = 010, 001, 100, or 000 | RH option, i.e., j vs g(j) = 011, 101, 111, or 110 |
|---|---|---|
| | vocA | |
| | | vocB |
| | | instA |
| | instB | |

| Block 34 (8 quarters only) | LH option, i.e., j vs g(j) = 010, 001, 100, or 000 | RH option, i.e., j vs g(j) = 011, 101, 111, or 110 |
|---|---|---|
| | | |
| | | |
| | | instA |
| | instB | |

| Block 35 (CODA concludes; 8 quarters only) | LH option, i.e., j vs g(j) = 010, 001, 100, or 000 | RH option, i.e., j vs g(j) = 011, 101, 111, or 110 |
|---|---|---|
| | | |
| | | |
| | | instA fades |
| | instB fades | |

Figure 8B (Continued)

METHOD OF CREATING MUSICAL COMPOSITIONS AND OTHER SYMBOLIC SEQUENCES BY ARTIFICIAL INTELLIGENCE

RELATED APPLICATIONS

This application is a continuation in part of U.S. application Ser. No. 16/144,521, filed Sep. 27, 2018. U.S. application Ser. No. 16/144,521 claims the benefit of U.S. Provisional Application No. 62/563,669, filed Sep. 27, 2017. This application is also related to U.S. Pat. No. 5,606,144, which issued on Feb. 25, 1997, U.S. Pat. No. 9,286,876 which issued on Mar. 15, 2016, and U.S. Pat. No. 9,286,877, which also issued on Mar. 15, 2016. All of these applications and patents are herein incorporated by reference in their entirety for all purposes, including all the computing devices, platforms, and applications disclosed in U.S. Pat. Nos. 9,286,876 and 9,286,877.

COPYRIGHT NOTICE

A portion of the disclosure of this patent document contains material that is subject to copyright protection. The copyright owner has no objection to the facsimile reproduction by anyone of the patent document or the patent disclosure, as it appears in a published Patent and Trademark Office patent file or record, but otherwise reserves all copyrights whatsoever.

FIELD OF THE INVENTION

The invention relates to methods for composing music and creating other novel sequences of symbols, and more particularly, to methods for applying artificial intelligence to the composition of music and creation of other novel sequences of symbols.

BACKGROUND OF THE INVENTION

Artificial intelligence ("AI"), which can be defined as the capacity of computers or other machines to exhibit or simulate intelligent behavior—and machine learning (a subset of AI), which can be defined as the capacity of a computer to learn from experience, i.e. to modify its processing on the basis of newly acquired information, have become powerful tools for analyzing data, recognizing patterns, making predictions, and creating novel output that can supplement, augment, or in some cases even substitute for creations that previously required human authorship. Recently, an artificial intelligence system referred to as "DABIS" was named the sole inventor on two patent applications, although the inventorship was ultimately disallowed by the European patent office. Other creations by AI systems have included mathematical proofs, and even novel poetry and musical compositions.

As the terms are used herein, "machine learning" and "artificial intelligence" or "AI" refer to any system implemented by one or more computing devices that can accept training "data" as input, can analyze the training data and recognize recurrent themes, features, and patterns therein, and can create novel output that is consistent with the recognized themes, features, and patterns. Much of the disclosure herein is presented in the context of music composition. However, it will be understood that music is ultimately a type of symbolic sequence, and that the disclosure presented herein can also be applied to the creation of novel non-musical symbolic sequences, including biological and pharmaceutical applications such as DNA sequencing, synthetic biology, and combinatorial chemistry.

In particular, artificial intelligence can serve as a tool for assisting users, including musicians and non-musicians, to create new music. Indeed, there exists an entire industry built around AI services for creating music. Many of these systems work by using deep learning networks, a type of machine learning that can involve large amounts of input or "training" data.

Two approaches have emerged for AI-driven music composition. According to the first approach, established music theory is "taught" to an AI system, including the principles of musical arranging and orchestration, so that the AI is able to generate novel music, either from scratch or from a "kernel." The AI is subsequently fed huge amounts of source material, e.g., dance hits and disco classics, which it then analyzes to find patterns regarding length, tempo, chords, and how notes relate to one another. The AI is then able to create novel music that is consistent with the patterns that have been learned from the training input.

According to the second approach, large data sets of music are mined by machine learning algorithms, so that the AI "learns" how to compose similar music by deriving its own models of music theory and composing novel music based on these models. For example, AI's have been trained on large data sets of music that was composed by well-known classical composers (e.g., Bach, Mozart, and Beethoven). Based on this training data, such AI systems have been able to compose music in a similar style. For example, an AI can be built to help produce songs in the style of the Rolling Stones or Coldplay. [SyncedReview: Miaozhen Zhang. Sep. 9, 2018. "AI's growing role in music composition."]

In some cases, an AI is also taught to associate various emotions with patterns that are recognized in the music that is provided as training input, so that the AI is able to create novel music having characteristics such as fast or slow tempi, short or longer song lengths, moods, and styles that evoke desired emotions or sensations. Such AIs have been used to provide inexpensive background music, e.g., for videos, offices, elevators, etc.

While AI-composition of music has found increasing applications, one of the most significant drawbacks associated with AI-composed music is a perceived lack of original artistic "style." Though what constitutes original artistic style can be difficult to characterize, AI-driven music, in mimicking other musical styles, does not result in new musical styles.

Virtually all music experts agree on the importance of a distinctive style for any artist of consequence. Classical musicians only have to hear a few bars of a work by Brahms to immediately know this is Brahms, regardless of whether the piece is known. The same goes for the Beatles or Miles Davis. There is no way Beethoven wanted to sound like his teacher Haydn. Similarly, the Beatles were not content to sing covers in the style of an earlier singer or band. They wanted to evolve their own style. Here, style refers to the methods of treating all the elements of music: form, harmony, melody, rhythm, timbre, texture, and so on. [Apel, W. *Harvard Dictionary of Music*. Harvard University Press, Cambridge, Mass., 2003]

Nevertheless, human experts such as musicologists and theorists disagree as to any general approach by which a recognizable new style can be imparted to a body of artistic work. While there may be some agreement among experts as to the stylistic features that characterize the work of specific artists, there is generally little agreement as to a general template that could be used by an AI to create an original artistic style. As a result, music that is AI-composed tends either to be generic in style, i.e. lacking any distinctive style, or it tends to mimic the styles of the music that was provided to the AI as training data.

Accordingly, while AI has been useful for composing music that mimics known styles, it has proven to be of limited use to composers who wish to create novel music with new and original styles. In fact, existing A approaches to music composition do little to augment the distinctive compositional style of a user, and may even tend to obscure the style of the user. This is because A systems, and especially deep learning systems, often learn from very large training data sets. Therefore, even if the training data includes some works by the composer who is using the AI, the possibly large size of the required training data set necessarily means that the majority of the training data will not have been composed by the user, and therefore will not reflect the user's individual style.

Instead, new works created by the AI will tend to replicate musical styles of the past, instead of reflecting the distinct style of the user, and instead of creating music that can push creators, performers, and audiences into exciting new musical worlds. As some music producers have lamented, AIs learn by analyzing music of the past, and this fact prevents the AIs from looking into the future to deduce how to create a new style.

What is needed, therefore, is a method of using artificial intelligence to create new works of music and other symbolic sequences that reflect and augment the individual compositional style of the user, and/or introduce novel musical styles.

SUMMARY OF THE INVENTION

The present invention is a method of using artificial intelligence to create new works of music and other symbolic sequences that reflect and augment the individual compositional style of the user, and/or introduce novel styles. Specifically, the present invention creates a large quantity of training data, as may be required by a deep learning AI, where the training data is derived mainly or entirely from only one, or only a few, "seed" compositions, which can be works composed by the user and/or works selected by the user that reflect a distinctive compositional style or creative signature that the user wishes to impart to the AI-composed works. The large body of training data is derived by applying variation and/or mash-up methods to the seed composition(s). It should be noted that a mash-up is, in fact, a type of musical variation. However, the term "variation" is generally used herein to refer to methods that create variants based primarily or solely on a single input composition, whereas the term "mash-up" is generally used herein to refer to methods that combine more than one input composition to produce a novel composition.

The variation methods can include any or all of the methods previously introduced by the present inventor. These include the "Chaotic Mapping" methods described in Dabby, D. S., "Musical Variations from a Chaotic Mapping", 1995 MIT doctoral thesis, in Dabby, D. S., "Musical Variations from a Chaotic Mapping", *Chaos,* 1996, and in U.S. Pat. No. 5,606,144. Also included are the "Improved Chaotic Mapping" methods described in U.S. Pat. Nos. 9,286,876 and 9,286,877, as well as methods of creating "Chaotic Mash-ups" and other variations that are described herein.

Since a virtually infinite number of variations and mash-ups is possible, the AI training data set can be as large as desired.

In embodiments, the same or similar variation and mash-up methods are also applied to the music that is composed by the AI, so as to further extend the novelty of the resulting musical styles.

A user is able to provide creative input to the presently disclosed AI-music composing method in at least three ways. First, the user is able to compose and/or select the seed composition(s) that are used to generate the training data for the AI.

Second, the user is able to control the parameters that govern the variation and/or mash-up processes that are applied to the seed composition(s) so as to create the AI training data. The compositions that result from the applied variation and/or mash-up methods are based on input variations that can be "tuned" to any desired degree of variability. This means input compositions undergoing greater variation can point to styles of music further removed from the era of the original song, where the degree of variability depends on user choice. Thus, the output compositions that result from applying variation and mash-up methods can be close to the original compositions, or mutate almost beyond recognition, as well as achieving degrees of variability in between these two extremes.

Third, the user is able to select from among musical compositions that are produced by the AI those compositions that best meet the user's goals in terms of creating music with a unique, distinctive, personal style. In embodiment, the user is further able to control the parameters that govern any additional variation and/or mash-up process that are applied to the AI-produced musical compositions. In some embodiments, selected AI compositions, with or without further variation and/or mash-up, are added to the training data and used to re-train the AI.

The methods that have been introduced by the present inventor, including the "ChaoticMash-up" methods described below, are able to generate multiple variations of an existing musical composition or compositions. Moreover, according to the degree of stylistic variation desired, these algorithms can push the music forward into new modes of expression, meaning, and message, not only generating pitch variations, but also rhythmic variations, and pitch-rhythmic variations. The goal is to not only move music forward, but also move it forward based on a human being's own musical style rather than relying on music of the past. In addition, the mash-up algorithms introduced by the present inventor can move the needle farther on artistic collaboration by offering creators a platform to deliberately commingle musical compositions, and/or blend an array of different ideas to produce more complex music. As such, these variations and mash-ups can be ideal as training input for A music composition.

In the U.S. Pat. Nos. 5,606,144, 9,286,876, and 9,286,877, and in other previous work by the present inventor, a "chaotic mapping" and "improved chaotic mapping" technique are disclosed for generating variations on an existing work, for example, musical variations of a given musical work. It should be noted that the term "variation" is used herein to refer to any process by which some features of a work (such as a musical piece) change while other features remain the same. The term "variation technique" is used herein to refer to (1) any modification scheme, (2) any compositional procedure, or (3) any combination of elements (1) and (2).

An "improved chaotic mapping technique," as described in these patents, produces musical variations of MIDI and MP3 files. The mapping in embodiments of my prior patents utilizes two chaotic trajectories from the Lorenz equations-a system comprising three nonlinear first order differential equations $$dx/dt = \sigma(y-x) \quad (1)$$

$$dy/dt = rx - y - xz \quad (2)$$

$$dz/dt = xy - bz, \quad (3)$$

where $\sigma=10$, $b=8/3$, and $r=28$ (E. N. Lorenz, "Deterministic nonperiodic flow," J. Atmos. Sci. 20, 130-141 (1963)). Other embodiments use at least one scheme selected from the group consisting of (1) other chaotic systems, (2) probabilistic methods, (3) pattern matching, (4) machine learning, and (5) signal processing.

The Lorenz equations arise in applications ranging from lasers to private communications, and have also served as generators of "chaotic" music, where a chaotic system is allowed to free-run and its output converted into a series of notes, rhythms, and other musical attributes in order to create a piece from scratch. However, these approaches did not generate variations or mash-ups on an already completed piece.

The improved chaotic mapping of these prior patents utilizes a mapping strategy in conjunction with designated variation procedures to produce musical variations of MIDI (Musical Instrument Digital Interface) songs, as well as audio recordings, e.g., WAV and MP3. According to the improved chaotic mapping approach, chaotic algorithms are used to identify hole elements within an input series of notes or other elements. Algorithms are also used to identify substitution elements that are substituted for the hole elements.

The improved chaotic mapping method produces a rich array of MIDI and audio variations and mash-ups. Some embodiments include:

Applications of chaotic mapping to inputs that are ordered sets of discrete items, such as MIDI files or other lists of notes, note durations, and note onset times, Applications of chaotic mapping to inputs that are continuously varying functions, such as recordings of music. Some embodiments include parsing a continuous recording of sound into discrete notes, note durations, and time intervals between notes.

A given substitution element can be restricted to replacing only one hole element. A variation procedure can be applied to a selected substitution element. If the input is a musical input, a substitution element can be derived from music that is part of the input, distinct from the input but part of a musical composition to which the input belongs, or part of a musical composition to which the input does not belong.

A substitution element can be derived from a musical seed source or other seed source which is distinct from the input and includes an ordered set of elements. An element of the seed source can be selected which immediately follows an element which is at least similar to the element immediately preceding the hole element. A chaotic mathematical function can be applied to a seed source in order to select, modify, or select and modify a substitution element. The substitution element can be (1) a plurality of elements of the seed source, (2) modifications to elements of the seed source by any of scanning, stenciling, interval shift, insertion, reversal, inversion (dynamic), repetitive beat structure, repetitive phrase structure, or (3) any combination of (1) and (2).

For any of musical inputs and seed sources, providing a substitution element that can be modified by any of changing pitch order, pitch duration, pitch onset time; inverting a pitch (for example about a closest preceding pitch belonging to an element which is not a hole element); moving a note by a specified interval; and/or adding at least one note having a pitch which is offset by a specified musical interval from a pitch included in the hole element.

In some embodiments providing a substitution element that can be modified by application of a pitch or timing mask element to the hole element and applying at least one of "and," "inclusive or," and "exclusive or" logic between the mask and the hole element. The mask element can be another of the original elements or an outside element.

FIG. 1A illustrates an application of improved chaotic mapping method, showing how the first 16 pitches of a variation of the Bach Prelude in C (from the Well-tempered Clavier, Book I) were constructed (FIG. 1A, part A). One pitch immediately stands out in the variation: the last pitch G # (shown in part A) does not occur in the original Bach Prelude (nor does its enharmonic equivalent Ab). The G # arises from improved chaotic mapping working in conjunction with Dynamic Inversion, described in more detail below.

FIG. 1A, part B shows the pitch sequence {pi} of the Bach Prelude in C where each pi denotes the ith pitch of the sequence. A fourth-order Runge-Kutta implementation of the Lorenz equations simulates a chaotic trajectory with initial condition (IC) of (1, 1, 1) where each $x_{i,j}$ denotes the ith x-value of this first chaotic trajectory, shown in FIG. 1A, part C.

FIG. 1A, part D plots the sequence of x-values $\{x_{2,j}\}$ of a second chaotic trajectory with ICs (1.002, 1, 1) differing from those of the first trajectory. The values in FIG. 1A part D have been rounded to two decimal places. (Rounding takes place after each trajectory has been simulated.) FIG. 1A, part E shows the result of applying a 'hole-generating' function, $w(x_{2,j})=g(j)$, where $g(j)$ is assigned the value of the index i of the least $x_{1,j}$ for which $x_{2,j} \leq x_{1,j}$. Blackened 'holes' indicate all j for which $j=g(j)$, and signify those places in the variation that will retain the pitches of the original Bach. Open 'holes' indicate those j for which $j \neq g(j)$ and serve as holding places for new pitch events ('filler' events). As an example, for j=1, apply the function $w(x_{2,j})=g(j)$ to determine the value of g(1): first deduce that the initial value of $x_{2,1}$ is 1.002 from part D, which is now rounded to 1.00 before the hole-generating function is applied, as noted above; find the least $x_{1,i} \geq x_{2,1}$ (i.e., find the smallest $x_{1,i}$ that equals or exceeds 1.00; the smallest $x_{1,i}$ is $x_{1,1}=1.00$); take the value of the index i of $x_{1,1}$ which is 1 and assign it to $g(1) \rightarrow g(1)=1$.

Similarly, for j=9, first deduce the value of $x_{2,9}=15.24$ from part D; find the least $x_{1,i} \geq 15.24$ which is $x_{1,9}=15.26$; take the value of the index i of $x_{1,9}$ which is 9 and assign it to $g(9) \rightarrow g(9)=9$. Applying the 'hole-generating' function to $x_{2,1}$ and $x_{2,9}$ yields blackened holes since $j=g(j)$ in both cases. On the other hand, open holes denote those j for which $j \neq g(j)$. For example, for j=4, apply the function $w(x_{2,j})=g(j)$ to determine the value of g(4): first deduce the value of $x_{2,4}=3.68$ from part D; find the least $x_{1,i} \geq 3.68$ which is $x_{1,5}=6.40$; take the value of the index i of $x_{1,5}$ which is 5 and assign it to $g(4) \rightarrow g(4)=5$. Since $j \neq g(j)$, i.e., since $4 \neq g(4)$, an open hole results for location 4 in the Hole Template.

Likewise, for Hole Template locations 5-7 and 16, it can be verified that j≠g(j), and so open holes arise in these locations as well.

Blackened holes indicate no change from the source Bach, and open holes indicate changes will occur in those locations. The notes that will change—$N_{c,4}$, $N_{c,5}$, $N_{c,6}$, $N_{c,7}$, and $N_{c,16}$—are indicated above the open holes. Each $N_{c,j}$ denotes the pitch number of the $j^{th}$ pitch of the source piece for which j≠g(j). The unchanging notes of the Bach and the prior event pitches $E_{p,3}$ and $E_{p,15}$, which will serve as the reference pitches for the Dynamic Inversion process explained in parts F and G, are marked above the blackened holes. For example, prior pitch event $E_{p,3}$ represents the pitch immediately prior to four 'open holes' in the variation; here $E_{p,3}$ corresponds to the third blackened hole=G4. This prior pitch event $E_{p,3}$=G4 functions as the reference pitch for the Dynamic Inversion of those Bach input file pitches 4-7, i.e., $N_{c,4}$, $N_{c,5}$, $N_{c,6}$, and $N_{c,7}$, which will all be inverted about the G4. Thus, the $N_{c,j}$'s will be inverted about the pitch occupying the previous blackened hole—here, G4. In the Dynamic Inversion procedure, reference pitches are defined by, and change according to the Hole Template of improved chaotic mapping. Thus, each differs from any other reference pitch, e.g., $E_{p,3}$≠$E_{p,15}$ so that the reference pitches are dynamic rather than fixed or static. By contrast, in past and current commercial computer practice, inversions are taken about a reference pitch that is fixed, e.g., middle C (C4) or a user-supplied reference pitch.

The process of Dynamic Inversion is set up in FIG. 1A, part F using explicit pairing between all the pitches from A3 to E5 with the numbers 57 to 76 (middle C=C4=pitch number 60) so that each unit increment results in a pitch one half step higher. Those pitches $N_{c,j}$ of the original Bach which will ultimately change in the variation are marked ($N_{c,4}$, $N_{c,5}$, $N_{c,6}$, $N_{c,7}$, and $N_{c,16}$). Each of these corresponds to one of the open holes 4-7 and 16 in the Hole Template of part E. Each prior event pitch $E_{p,j-1}$ that serves as a reference pitch for the Dynamic Inversion procedure is also indicated ($E_{p,3}$ and $E_{p,15}$). The prior event pitches $E_{p,3}$ and $E_{p,15}$ correspond to the third and fifteenth blackened holes, respectively, of the Hole Template of part E.

Since j=g(j) for the first three events of the variation, as already determined by the Hole Template of part E, the original Bach pitches will occur in locations 1-3 of the variation. The same is true for the $8^{th}$-$15^{th}$ pitches of the variation. However, since j≠g(j) for j=4, . . . , 7, 16, the variation will change from the source according to the expression for improved chaotic Mapping working in conjunction with said Dynamic Inversion procedure:

$$f(x_{2,j}) = \begin{Bmatrix} p_{g(j)}, & j = g(j) \\ P_N, & j \neq g(j) \end{Bmatrix} = p'_j, \quad (4)$$

where g(j) is assigned the value of the index i of the least $x_{1,i}$ for which $x_{2,j} \leq x_{1,i}$. Here, Dynamic Inversion is used to calculate each new pitch $P_N$ of the variation using the expression $N=-(N_{c,j}-E_{p,j-1})_{MOD12}+E_{p,j-1}$, where N, denotes the pitch number of the $j^{th}$ pitch of the source piece for which j≠g(j), and $E_{p,j-1}$ is defined in terms of $N_{c,j}$ as the pitch number of the (j−1) pitch of the original pitch sequence that occurs before one or more consecutive $N_{c,j}$'s. As stated earlier, the prior event $E_{p,j-1}$ serves as the dynamic reference pitch about which the inversion of one or more consecutive $N_{c,j}$'s will occur.

To find p'$_4$, the fourth pitch of the variation, calculate $P_N$ where $N=-(N_{c,4}-E_{p,3})_{MOD12}+E_{p,3}=-(72-67)+67=62 \rightarrow P_{62}=D4=p'_4$, the $4^{th}$ pitch of the variation. Pitches p'$_5$, p'$_6$, and p'$_7$ result from a similar procedure. The mod 12 option did not apply in determining p'$_4$. Though it was not necessary here, it can be invoked to preclude inversions that move up/down from any reference pitch by more than an octave. To see how the G #4 is assigned to p'$_{16}$, again calculate $P_N$ where $N=-(N_{c,16}-E_{p,15})_{MOD12}+E_{p,15}=-(76-72)+72=68 \rightarrow P_{68}=G$ #4=p'$_{16}$.

Applying improved chaotic Mapping in conjunction with Dynamic Inversion yields the variation sequence displayed in FIG. 1A, part G: {p'$_j$}={$P_{g(1)}$, . . . , $P_{g(3)}$, $P_{62}$, $P_{58}$, $P_{67}$, $P_{62}$, $P_{g(8)}$, . . . , $P_{g(15)}$, $P_{68}$}. Pitches 1-3 and 8-15 in the variation, corresponding to blackened holes, do not change from those occurring at locations 1-3 and 8-15 in the pitch sequence of the source Bach. But pitches 4-7 and pitch 16, corresponding to open holes do change from those occurring in locations 4-7 and 16 in the source Bach, in accordance with improved chaotic Mapping and the Dynamic Inversion process.

FIG. 1B shows an exemplary algorithm, (Blocks [1] through [7]), of improved chaotic mapping of FIG. 1A, applicable to signals that are discrete time, continuous time, or a combination of discrete-time and continuous-time signals. To make variations of a sequence of events, improved chaotic mapping is given by $$f(x_{2,j}) = \begin{Bmatrix} e_{i=g(j)}, & j = g(j) \\ E_j, & j \neq g(j) \end{Bmatrix} = E'_j, \quad (5)$$

where E'$_j$ represents any event of the variation, $e_{i=g(j)}$ denotes any pitch, chord, phrase, beat, note rhythmic value, note-group, musical event from the source work, and combination thereof, that will appear unchanged in the variation as a result of the condition j=g(j), and $E_j$ represents any musical event in the variation produced by improved chaotic mapping in conjunction with a designated variation procedure whenever j≠g(j). The term g(j) is assigned the value of the index i of the least $x_{1,i}$ for which $x_{2,j} \leq x_{1,i}$.

In Block [1], the first chaotic trajectory {$x_{1,i}$, $y_{1,i}$, $z_{1,i}$}, indexed on i, with initial conditions ($x_{1,1}$, $y_{1,1}$, $z_{1,1}$) is launched. A second chaotic trajectory {$x_{2,j}$, $y_{2,j}$, $z_{2,j}$}, indexed on j, with initial conditions ($x_{2,1}$, $y_{2,1}$, $z_{2,1}$) is simulated in Block [2]. The hole-generating function $w(x_{2,j})=g(j)$ of Block [3] takes each x-value of the second chaotic trajectory (possibly including y-z-values of same) and determines g(j), where g(j) is assigned the value of the index i of the least $x_{1,i}$ such that $x_{2,j} \leq x_{1,i}$. The hole-generating function creates the Hole Template of Block [4] according to whether or not j=g(j). If so, a blackened hole appears at the appropriate j; if not, an open hole occurs.

Block [4] shows a hypothetical example of a Hole Template (resulting from Block [3]), where M represents any given integer. Here, M is the hypothetical value of the leftmost j in the plotting. Suppose that applying the hole-generating function, $w(x_{2,j})=g(j)$, to $x_{2,j}$ results in j=g(j), and equivalently M=g(M) for the j=M location in the drawing. Thus, for j=M, a blackened hole results. Suppose further that the same process applied to the next x-value $x_{2,j}$, where j=M+1, also results in j=g(j)→M+1=g(M+1). Then for j=M+1, a blackened hole appears. As stated earlier, blackened holes denote those j for which j=g(j). Here, blackened holes result from applying the hole-generating function to the two x-values $x_{2,M}$ and $x_{2,M+1}$, as well as to the x-values $x_{2,M+5}$ and $x_{2,M+6}$. But now suppose that for $x_{2,j}$ where j=M+2, the hole-generating function returns a value for g(j) that does not equal j. Thus an open hole occurs for j=M+2. Ditto for j=M+3 and j=M+4.

Block [5A] supplies the event sequence $\{e_j\}$ of a source work—which can include MIDI events, audio events, or both—to improved chaotic mapping of Block [5B]. Note that if the event list consists of more than one musical attribute (e.g., MIDI pitch, onset time, and velocity), each can be varied separately, or together, by applying this exemplary algorithm to one or more axes in 3-space, or to n axes in n-space, e.g., where n axes result from harnessing additional chaotic systems.

Improved chaotic Mapping is applied in Block [5B] whenever j=g(j), i.e., at the blackened holes. This results in events $e_{j=g(j)}$ occurring in the same spot in the variation as in the source piece. Thus for this hypothetical example, original events $e_M$, $e_{M+1}$, $e_{M+5}$, $e_{M+6}$ fill the blackened holes $E'_{j=M}$, $E'_{j=M+1}$, $E'_{j=M+5}$, and $E'_{j=M+6}$ in the variation shown in Block [7].

Block [6A] provides a designated variation procedure which will work in tandem with improved chaotic Mapping of Block [6B] to generate new events $E_j$ whenever j≠g(j), i.e., at the open holes. Thus, for this hypothetical example, new events $E_{M+2}$, $E_{M+3}$, and $E_{M+4}$ fill the open holes and are equivalent to $E'_{j=M+2}$, $E'_{j=M+3}$, and $E'_{j=M+4}$, in the variation shown in Block [7].

Block [7] contains the variation's event sequence $\{E'_j\}$ which comprises the sum of Blocks [5B]+[6B]. The contents of the blackened holes remain unchanged from the source event sequence. The open holes are filled with new events $E_j$ supplied by improved chaotic mapping in conjunction with a designated variation procedure(s). The variation is produced by merging the contents of the blackened and open holes to give the variation's final event sequence $\{E'_j\}$ = { . . . , $e_{g(M)}$, $e_{g(M+1)}$, $E_{M+2}$, $E_{M+3}$, $E_{M+4}$, $e_{g(M+5)}$, $e_{g(M+6)}$, . . . }.

In the embodiments described above, the hole-generating function of improved chaotic mapping produces a Hole Template where the number of open vs. blackened holes can vary depending on the initial conditions for the chaotic trajectories 1 and 2. In other embodiments, other schemes such as probabilistic methods can produce a Hole Template capable of receiving new events via, for instance, dynamic inversion. One inherent advantage of improved chaotic mapping over a probabilistic scheme lies in the fact that improved chaotic mapping has several built-in 'controls' or 'sliders' that determine the amount of variability—all arising from a natural mechanism for variability present in chaotic systems, i.e., the sensitive dependence of chaotic trajectories to initial conditions. Thus, the degree to which the initial conditions chosen for the second chaotic trajectory differ from those assigned to the first trajectory will directly affect the amount of variability present in a variation.

Parsing

Where the input to the improved chaotic mapping is a continuous function, it can be automatically divided or "parsed" into a sequential series of original elements which are segments of the input that can include (1) eighth note beats, (2) quarter note beats, (3) groups of eighth note beats, (4) groups of quarter note beats, and/or (5) combinations thereof, through automated detection of any of time signature beats, boundaries between musical phrases, and repetitive structures.

Automatic parsing of an input into segments or events such as segments comprising specified numbers of eighth-note or quarter-note beats, e.g., groups of 4 quarter note beats, can be accomplished by any number of audio beat detection methods. These give a sequence of timings that can then be used to cut the audio file into desired groupings, also referred to herein as "parses", "events", and elements (said terms being used herein as synonyms).

For example, detection of quarter note divisions allow groups of 2, 4, 8 or more quarter note divisions to function as parsed events. Each of the parses can be delineated by a start time plus a duration. A number of papers have been written on beat detection, e.g., "Multi-Feature Beat Tracking" [J. Zapata, M. Davies, and E. Gómez, IEEE/ACM Transactions on Audio, Speech, and Language Processing, Vol. 22, No. 4, April 2014]. There are many sites online that feature various open-source algorithms, e.g., Essentia and Queen Mary vamp plugins for Audacity.

Musical Variation, Remixes, and Mash-Ups.

Musical variation occupies a storied place in music, from the lutenists of 16th c. Spain to the remixes and mash-ups of today. In every society past and present, remix and mash-up variations spin contemporary songs into fresh ones.

For example, whenever Bach and his large musical family got together, they sang popular songs both comic and lewd-all at the same time. In composing his Goldberg Variations, Bach combined several German folksongs to create his final variation.

Today DJs carry on the tradition, remixing and mashing White Albums with Black Albums to create something new, like the Grey Album by Danger Mouse.

Many of today's songs are made by laying down tracks that are then combined to produce a full song. Thus each track is a "component" of the full song. First the instrumental track might be recorded. Then the vocalist(s) sings the song melody and records the solo vocal track. Finally, the component tracks, i.e. the solo vocal track and the instrumental track, combine to make the full song. But once the full song has been recorded, the vocal track by itself and the instrumental track by itself have little value, except for DJs and remix/mash-up aficionados. They take tracks and re-combine them in new and interesting ways, while adding effects like filtering, flanging, scratching, beat repeating, echo/delay, reverb, etc. In short, they take audio tracks and use digital audio workstations (DAWs) to create new takes, interpretations, and versions of the original song(s). But DJ skill requires time, effort, and money.

For the purposes of this description and the accompanying claims, "component", also referred to as "component track", means a track that is included in a musical composition, such as (1) an instrumental track, (2) a vocal track, (3) a percussion track, (4) any associated track contributing to the song, 5) any added track to a song, or (6) any combination(s) thereof. A "composition" means a work such as (1) a written musical score, (2) sound recording, (3) written text, (4) spoken text, (5) any component track of a song, or (6) any combination(s) thereof.

Prior work offered methods and apparatus for generating musical variations as shown in "Method and Apparatus for Computer-Aided Variation of Music and other Sequences, including variation by Chaotic Mapping" U.S. Pat. Nos. 9,286,876 and 9,286,877 (CIP). These methods enabled the process of creating song variations with the click of a few buttons, thus opening up the creative process to anyone with a digital device, computer, or mobile phone.

In accordance with prior work methods, a mash-up variation was made by beat-matching two different songs, concatenating both, then parsing the concatenated file, after which the improved chaotic mapping is applied, thus producing holes which are replaced with elements of both songs, some of which elements may have undergone a designated variation procedure. This previously disclosed mash-up method is referred to herein as a "chaotic mash-up" method.

A method is disclosed herein for varying musical compositions and other ordered inputs to create hybrid variations, whereby at least two songs and/or other inputs such as sound tracks are combined using the improved chaotic mapping of my prior art, in tandem with new methods of the present invention to create a new song or other output that is a so-called "mash-up." Embodiments present the resulting mash-up to a user in a printed score, recorded audio format, or both. The disclosed method emphasizes structure amidst variation when producing the mash-ups, so as to produce mash-ups with the discernible structure of a song. Some of these new methods make use of the by-products of the song production process-vocal and instrumental tracks-thus allowing artists and record companies additional revenue streams from what were formerly cast-off component tracks.

Embodiments of the invention make use of the improved chaotic mapping method and other prior work described above, but applied in novel ways. It should be noted that for ease of reference all of the the mash-up methods disclosed herein are referred to generically as "chaotic mapping mash-up" methods, although not all embodiments include application of chaotic mapping.

The disclosed method creates a mash-up of at least two inputs, which are generically referred to herein as songA and songB, although they need not be musical inputs. According to the disclosed method, songA and the at least one songB are first "parsed," i.e., divided into distinct elements, which can be elements of equal length, such as beats in a musical input. In embodiments, an input song that is a continuous function is automatically divided or "parsed" into a sequential series of elements which are segments of the input such as (1) eighth note beats, (2) quarter note beats, (3) groups of eighth note beats, (4) groups of quarter note beats, and (5) combinations thereof, through automated detection of any of time signature beats, boundaries between musical phrases, and repetitive structures.

The songs are then "beat matched," by shrinking or stretching each beat of songB so that it is equal in length to the corresponding beat of songA, beat-by-beat in sequence. In some embodiments, the song tracks are aligned by performing a null period process on a selected one of the inputs, where the null period process can be (1) adding a null period to the selected input; (2) deleting a null period from the selected input; and (3) any combination(s) thereof. For example, the vocal track of songB could be aligned so that it enters where the vocal track of songA would have entered, or if an upbeat is present, the downbeat of the vocal track of songB would occur where the initial downbeat of the vocals in songA would have occurred. Finally, the songs are combined to form a mash-up using any of several mash-up algorithms disclosed herein. In some embodiments, improved chaotic mapping is used to vary textures by which the parsed elements of the songs are combined, where texture in general "refers to the many [features] of music, including register and timbre of instrumental combinations, but in particular, it refers to music's density (e.g., the number of voices and their spacing)" as described in (S. Laitz. The Complete Musician, 2nd edition. Oxford, Oxford University Press, 2008).

In one general aspect of the present invention, referred to herein as the MUiMUv family of algorithms, the mash-up algorithm comprises using the improved chaotic mapping method to substitute elements selected from the components of at least one songB in place of selected elements from the components of songA.

In embodiments, after parsing and beat matching of the songs, improved chaotic mapping is used to select elements from the component tracks of songA and songB, whereby selected "hole" elements in the component tracks of songA are replaced by selected replacement elements from the component tracks of one or more songB's to produce modified component tracks of songA which have been infused with elements from the component tracks of songB. These infused component tracks of songA combine to produce a mash-up. Depending on the embodiment, any of several methods can be applied to modify the replacement elements before the substitution is made. In embodiments, the song tracks are aligned according to any of several criteria before the substitution elements are selected.

In embodiments, each of songA and songB comprises a plurality of component tracks. For example, suppose songA and songB are each a musical input that includes a vocal track and at least one instrumental track. In some of these embodiments improved chaotic mapping is applied separately to create a separate instrumental track mash-up of the instrumental tracks from songA and the at least one songB, as well as a separate vocal track mash-up of the vocal tracks from songA and the at least one songB. The two track mash-ups are then superposed to form the final mash-up. The term MUiMUv that is applied to this family of embodiments is derived from this approach and stands for "Mash-up instrumental Mash-up vocal."

In similar embodiments, track mash-ups can be created from tracks of differing types and then superposed. For example, elements of a vocal track of songB can be selected and used to replace selected elements of the instrumental track of songA.

In a second general aspect of the present invention, referred to herein as the muMap family of embodiments, after beat matching of the songs and, in embodiments, after alignment of the songs, the mash-up is created by introducing groups of parsed elements from component tracks of songA and groups of parsed elements from component tracks of songB into successive intervals or frames of a mash-up template in a staggered fashion. The combination of elements that is presented in each frame of the mash-up can be determined for example by (1) a fixed pattern of textures, (2) a desired pattern of textures, (3) a sequence of textures determined by an algorithm applied in conjunction with improved chaotic mapping, and (4) combinations thereof.

If, for example, each of the two songs includes two tracks, and if it is assumed that the parsed elements of the songs' tracks are to be maintained in relative alignment (i.e., without temporal shifting of the parsed elements) then there are a total of sixteen possible combinations of the four tracks, parses of which can be presented in each frame of the mash-up (no parses from tracks, parses from any one of four separate tracks, parses from any of six pairs of tracks, parses from any of four combinations of three tracks, and parses from all four tracks occurring simultaneously). The muMap approach can be combined with MUiMUv to produce even more complex mash-ups.

A repetition threshold can be established whereby some frames of the template repeat, while others are skipped. If songA is to be combined with a plurality of songB's to produce a plurality of mash-ups, then the order in which the combinations appear can be shifted or "rotated" so that greater variety is obtained.

It should be noted that temporal shifting, or rearrangement, or both temporal shifting and rearrangement, of the parses of songB relative to songA can be included in any of the mash-up approaches disclosed herein, not only for purposes of aligning the songs but also to provide for a wider range of possible mash-up variations.

It should also be noted that, much of the present disclosure that is discussed in terms of mash-ups, is applicable to both remixes and mash-ups. Accordingly, the term "mash-up" is used herein generically to refer to both remixes and mash-ups, except where the specific context requires otherwise.

The present invention is mainly described in this application in terms of its application to musical symbols or notes, following the illustrations of prior patents. However, it should be noted that the present invention is not limited to mash-up variations of music, and that embodiments of the present invention are generically applicable to all types of symbols, characters, images, and such like.

The present invention is a method of creating a novel ordered sequence of symbols. The method includes the following steps:
A) selecting by a user of at least one seed sequence of symbols;
B) generating by a computing device of a training data set by applying at least one variation and/or mash-up method to the at least one seed sequence;
C) training an artificial intelligence implementation ("AI") using the training data set;
D) causing the AI to produce at least one novel output sequence of symbols that is consistent with themes, features, and/or patterns recognized by the AI as being recurrent in the training data; and
E) presenting the novel output sequence of symbols to a user.

Embodiments further include repeating steps D) and E) after retraining the AI using a revised training data set that includes the novel output sequence of symbols.

Any of the above embodiments can further include applying at least one variation and/or mash-up method to the novel output sequence of symbols to create a modified output sequence of symbols. In some of these embodiments, the variation and/or mash-up method can include at least one of a chaotic mapping method, an improved chaotic mapping method, and a chaotic mapping mash-up method. Any of these embodiments can further include repeating steps D) and E) after retraining the AI using a revised training data set that includes the modified output sequence of symbols.

In any of the above embodiments, the seed sequences can be musical compositions, and the novel output sequence of symbols can be a novel musical composition.

In any of the above embodiments, generating the training data set in step B) can include creating a mash-up by combining elements derived from at least two of the seed sequences of symbols according to the following steps:
1. accepting from among the seed sequences of symbols a first input designated as "songA" and at least one additional input designated as "songB";
2. parsing songA into a series of consecutive songA elements;
3. parsing each songB into a series of consecutive songB elements, wherein each songA element corresponds to a songB element;
4. if each of the songA elements is not equal in length to its corresponding songB element, beat-matching songB with songA by adjusting lengths of at least one of the songA elements and the songB elements so that all songB elements are equal in length to their corresponding songA elements; and
5. combining songA with songB, in order to create a mash-up, said combining comprising application of at least one scheme selected from the group consisting of:
   a. applying improved chaotic mapping to any components of songA and/or songB in order to vary the components in advance of making the mash-up;
   b. applying improved chaotic mapping to songA and songB so as to create the mash-up by replacing selected songA elements with selected songA elements, replacing songB elements with selected songB elements, then superposing the results; and
   c. applying improved chaotic mapping to songA and songB so as to create a mash-up by replacing selected songA elements with selected songB elements, replacing songB elements with selected songA elements, then superposing the results.

In some of these embodiments, songA and songB are musical compositions or recordings. In any of these embodiments, after beat-matching, all of the songA elements and songB elements can have the same length. In any of these embodiments, songA can include a first plurality of song tracks and songB can include a second plurality of song tracks, so that each of the songA elements and songB elements comprises a plurality of song track elements, all of the song track elements within a given songA or songB element being equal to each other in length. In some of these embodiments, applying improved chaotic mapping includes applying improved chaotic mapping separately to pairs of the song tracks, each of the pairs comprising one song track from songA and one song track from songB, so that the mash-up includes at least one song track of songA in which song track elements thereof have been replaced by song track elements from a song track of songB. And in any of these embodiments the song tracks of songA can include a song track of a first kind, referred to herein as an instrumental track, and a song track of a second kind, referred to herein as a vocal track, and the song tracks of songB can include an instrumental track and a vocal track.

In some of these embodiments, applying improved chaotic mapping to songA and songB includes either applying improved chaotic mapping to the instrumental track of songA and the instrumental track of songB, and separately applying improved chaotic mapping to the vocal track of songA and the vocal track of songB, or applying improved chaotic mapping to the instrumental track of songA and the vocal track of songB, and separately applying improved chaotic mapping to the vocal track of songA and the instrumental track of songB.

In any of the embodiments in which the seed sequences are musical compositions, and the novel output sequence of symbols is a novel musical composition, the second input can includes a plurality of songB's from which the replacement elements are selected.

Any of the embodiments in which the seed sequences are musical compositions, and the novel output sequence of symbols is a novel musical composition, can further include aligning songB with songA by performing a null period process on a selected one of the inputs, the null period process comprising at least one of adding a null period to the selected input and deleting a null period from the selected input.

In any of the above embodiments, generating the training data set in step B) can include applying to the seed sequences of symbols a method practiced by a computing device for automatically creating an output, referred to herein as a mash-up, by combining elements derived from the seed sequences of symbols, the method comprising:

accepting a plurality of N inputs from among the seed sequences of symbols, the inputs being denoted as song(i) where i is an integer ranging from 1 to N, each of the song(i) comprising a plurality of song tracks;

for each i, parsing song(i) into a series of consecutive song(i) elements;

if all of the consecutive song(i) elements are not of equal length, adjusting the consecutive song(i) elements so that they are all of equal length, where said equal length is denoted as L(i);

beat-matching the inputs by adjusting at least one of the L(i) such that all of the L(i) of all of the inputs are equal to the same value L;

creating a mash-up template divided into consecutive mash-up frames of length k times L, where k is an integer, the mash-up template comprising a plurality of parallel mash-up tracks, each mash-up track being divided into a plurality of consecutive track frames of length k times L;

creating the mash-up by sequentially introducing elements from the song tracks of the inputs into the track frames of the mash-up template, so that each successive template frame of the mash-up template is populated by a combination of corresponding elements derived from the song tracks of the inputs, where said combination of corresponding elements can be derived from any number of the song tracks from zero up to the combined total number of the song tracks of the inputs and presenting the mash-up to a user.

In some of these embodiments, the inputs are musical compositions or recordings. In any of these embodiments, the number of mash-up tracks in the mash-up template can be less than or equal to the combined total number of song tracks in the inputs.

In any of these embodiments, the mash-up frames can include a beginning group thereof that are successively populated, such that each of a first group of one or more mash-up frames in the beginning group contains at least one corresponding element from only one song track, said first group being followed by a second group of one or more mash-up frames in the beginning group, each containing at least two corresponding elements from two song tracks, and so forth until at least one mash-up frame in the beginning group contains a corresponding element from each of the song tracks of the inputs.

In any of these embodiments, the combinations of corresponding elements that populate the track frames can vary from mash-up frame to mash-up frame according to a specified pattern. In some of these embodiments the pattern is repeated after a specified number of frames.

In any of these embodiments, the combinations of corresponding elements that populate the track frames can be determined using improved chaotic mapping. In some of these embodiments the combinations of corresponding elements that populate the track frames are determined with reference to a Rotating State Option Implementation Table, according to a series of 'Left-hand' or 'Right-hand' path options.

In any of these embodiments, the mash-up can be terminated by a Coda group of mash-up frames in which corresponding elements from the tracks of the inputs are successively eliminated until a mash-up frame in the Coda group includes only one corresponding element.

Any of these embodiments can further include modifying at least one of the corresponding elements before introducing it into a track frame.

And in any of the above embodiments, generating the training data set in step B) can comprise applying to the seed sequences of symbols a method of creating a plurality of mash-ups, the method of creating a plurality of mash-ups comprising successively aligning songB with songA by performing a null period process on a selected one of the inputs, the null period process comprising at least one of adding a null period to the selected inputs and deleting a null period from the selected input, wherein the combinations of elements introduced into the mash-up template are repeated in an order that is rotated from one mash-up to the next.

The features and advantages described herein are not all-inclusive and, in particular, many additional features and advantages will be apparent to one of ordinary skill in the art, in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5A illustrates the muMap algorithm which produces a structured mash-up in embodiments of the present invention;

FIG. 5B is a timing diagram illustrating an example of entry timing of vocB relative to instA;

FIG. 6A illustrates an improved muMap algorithm included in embodiments of the present invention;

FIG. 6B is a timing diagram illustrating an example of entry timing using the improved muMap algorithm;

FIG. 7 illustrates a variation on the improved muMap algorithm included in embodiments of the present invention;

FIG. 8A illustrates the four options for the Introduction of a mash-up produced by the LRmuMap algorithm;

FIG. 8B illustrates the LRmuMap algorithm included in embodiments of the present invention;

DETAILED DESCRIPTION

The present invention is a method of using artificial intelligence to create new works of music and other symbolic sequences that reflect and augment the individual compositional style of the user, and/or introduce novel musical styles. Specifically, the present invention creates a large quantity of training data, as may be required by a deep learning AI, where the training data is derived mainly or entirely from only one, or only a few, "seed" compositions, which can be works composed by the user and/or works selected by the user that reflect a distinctive compositional style or creative signature that the user wishes to impart to the AI-composed works.

Figure 2A:
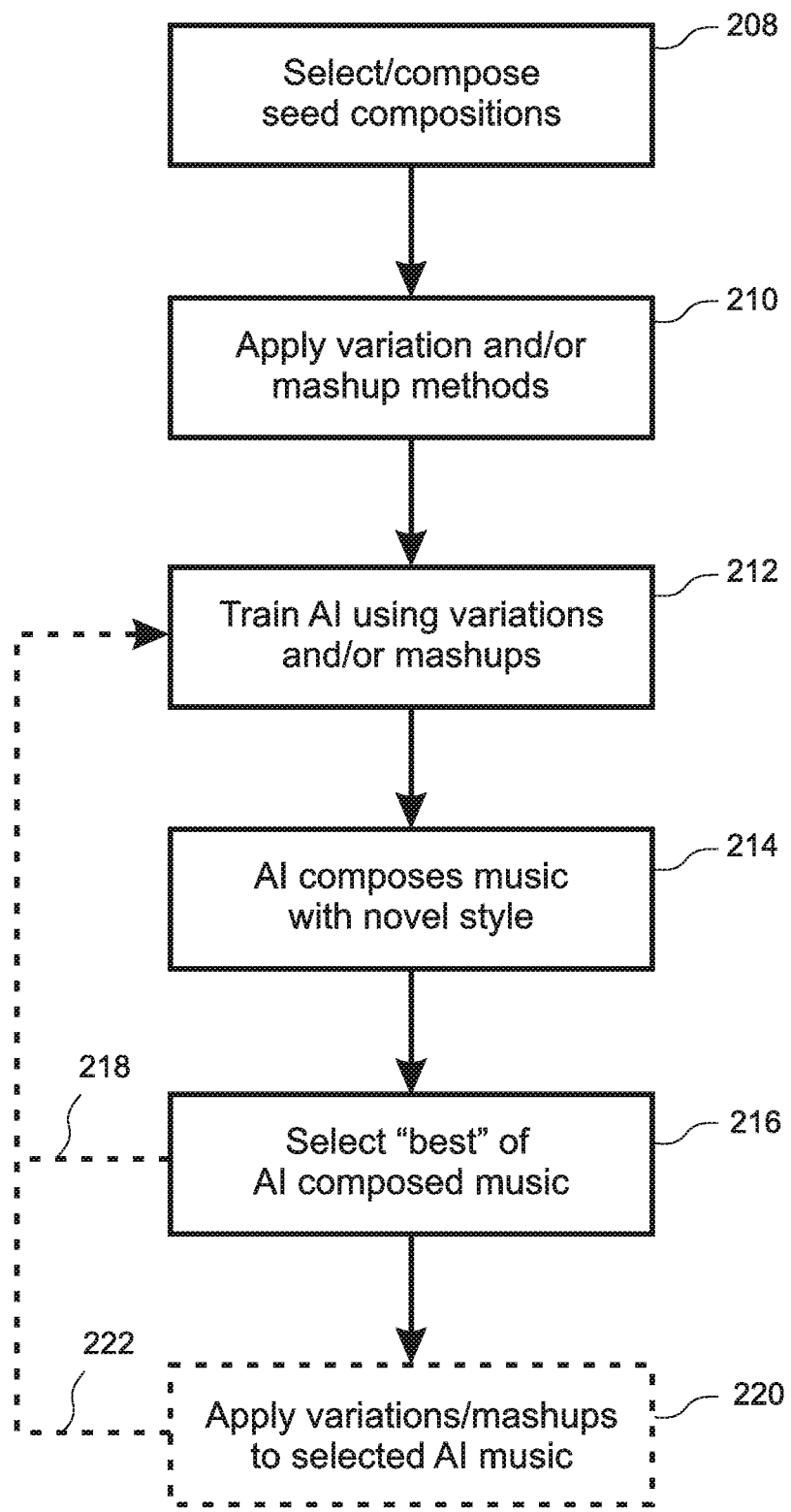
FIG. 2A is a flow diagram that illustrates a method of creating AI-composed music according to an embodiment of the present invention.

With reference to FIG. 2A, the present method begins with the user providing one or more "seed" compositions 208, which can include music composed by the user and/or music composed by others and selected by the user. The large body of input data that is required for training an AI is then derived by applying variation and/or mash-up methods 210 to the relatively small number of seed composition(s). The variation methods can include any or all of the variation methods introduced by the present inventor, as described in U.S. Pat. Nos. 5,606,144, 9,286,876, and 9,286,877. Mash-ups, another form of musical variation, can be created according to the methods described herein, whereby the compositions that are used to create the mash-ups are selected from among the seed compositions and/or variations thereof.

Once a sufficiently large training set of compositions has been generated by the variation and/or mash-up methods as applied to the seed compositions, the training set is provided to the AI 212, which analyzes the training set to recognize recurrent themes, features, and patterns therein. Once this training 212 is completed, the AI proceeds to compose new musical works 214.

The AI-generated musical compositions will generally reflect a unique, distinctive, and personal style of the user, because the training data is derived from seed compositions that were either composed by the user and/or carefully selected by the user 208. The user will furthermore have selected and optimized all of the parameters that control the variation and/or mash-up processes that are applied to the seed compositions 210. Indeed, due to the ability of the applied variation and/or mash-up algorithms to introduce stylistic changes, the AI-generated musical compositions may even extend and go beyond the user's established style.

In addition, once the AI has produced a body of new compositions, the user will assert yet another level of control over the process by selecting 216 from among the AI-composed music those works that best embody the style and musical goals of the user.

In embodiments, the selected AI compositions can be "fed back" to the AI as additional training data 218, thereby causing the AI to "converge" on a novel style that best reflects that user's personal style and musical goals. In addition, the user can optionally apply the same or similar variation and/or mash-up methods to the AI-composed selections 220 so as to further extend the stylistic novelty, and essentially to "break new ground" musically. These variations and/or mash-ups of the AI-composed music can also be re-directed to the AI 222 as additional re-training input.

Accordingly, a user is able to provide creative input according to the presently disclosed AI-music composing method in at least three ways. First, the user is able to compose and/or select the seed composition(s) 208 that are used to generate the training data for the AI. Second, the user is able to control the parameters that govern the variation and/or mash-up processes that are applied to the seed composition(s) 210 so as to create the AI training data. Third, the user is able to select 216 from among musical compositions that are produced by the AI, i.e. those compositions that best meet the user's goals in terms of creating music with a unique, distinctive, and personal style. In embodiments, the user is further able to control the parameters that govern any additional variations and/or mash-up processes 220 that are applied to the AI-produced musical compositions.

The variation and mash-up methods that have been introduced by the present inventor, including the mash-up methods described below, are able to generate multiple variations of an existing musical composition. Moreover, according to the degree of variation desired, these algorithms can push the music forward into new modes of expression, not only generating pitch variations, but also rhythmic variations, and pitch-rhythmic variations. The goal is to not only move music forward, but also move it forward based on a human being's own musical style rather than relying on music of the past. In addition, the mash-up algorithms introduced by the present invention can move the needle farther on artistic collaboration by offering creators a platform to deliberately commingle musical compositions, and/or blend an array of different ideas to produce more complex music. As such, these variations and mash-ups can be ideal as training input for AI music composition.

The currently disclosed mash-up methods build on the earlier work of the present inventor as described above, improving upon it by offering methods for generating mash-ups, which include remixes, by using mash-up algorithms disclosed herein to combine elements from a plurality of musical works or other inputs. In embodiments, the mash-up algorithms can include application of improved chaotic mapping. Furthermore, some of these new methods can make use of the by-products of the song production process—vocal and instrumental tracks—thus allowing artists and record companies additional revenue streams from what were formerly cast-off song component tracks.

It should be noted that, while much of the present disclosure is discussed in terms of mash-ups, the present invention is applicable to both remixes and mash-ups. Accordingly, the term "mash-up" is used herein generically to refer to both remixes and mash-ups, except where the specific context requires otherwise.

Similarly, much of the discussion presented herein is directed to the mash-up of two hypothetical musical works songA and songB. However, it will be understood that the method disclosed herein is not limited to music that includes vocal tracks, and can be applied to any musical compositions, and indeed to any ordered sequences of inputs. These can even include biological applications, such as synthetic biology (variation of gene sequences) and combinatorial chemistry (variation of chemical structures and chemical mixtures, as "variations" and "mash-ups" respectively, to derive new pharmaceutical candidates).

Figure 2B:
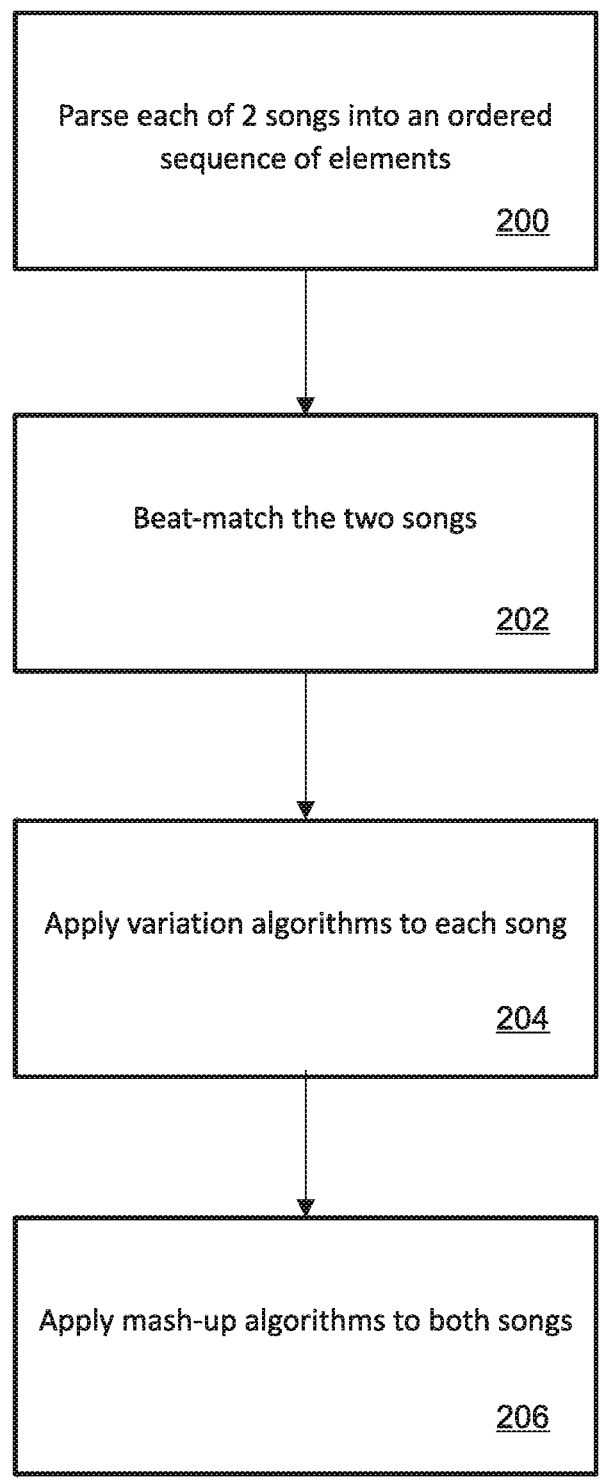
FIG. 2B is a flow diagram that illustrates the basic steps of creating a mash-up according to an embodiment of the present invention.

With reference to FIG. 2B, in embodiments of the present method of creating mash-ups the inputs, e.g., song A and song B that are continuous functions, are automatically divided or "parsed" 200 into sequential series of original elements which are segments of the inputs. Note that these "elements" or "segments" are also referred to herein variously as "groupings," "parses," and "events," said terms being used herein synonymously. In various embodiments, the segments are determined for example by dividing the inputs into parses selected from the group consisting of (1) eighth note beats, (2) quarter note beats, (3) groups of eighth note beats, (4) groups of quarter note beats, and (5) combinations thereof, through automated detection of any of time signature beats, boundaries between musical phrases, and repetitive structures. For example, detection of quarter note divisions can be used to allow groups of 2, 4, 8 or more quarter note divisions to function as parsed events. Each of the parses can be delineated by a start time plus a duration.

Beat-Matching

After both songs have been parsed (200 in FIG. 2), for example into desired eighth-note or quarter-note beats, each beat of the second song (songB) is beat-matched 202 to each beat of the first song (songA), in sequence, beat-by-beat. In order to accomplish this, each of the beats of songB is stretched or shrunk so as to match the duration of the corresponding beat of songA. Specifically, a ratio is calculated for each beat of SongB that is to be beat-matched, said ratio being the length of each beat of songB, L2,i, divided by the length of each beat of songA, L1,i, i=1, ..., K, where K denotes the number of beats in the shorter of the two songs. Accordingly, the start time and duration of each beat in songB must be adjusted by a ratio L2,i/L1,i calculated for that beat, so that the beats are in the correct places for the new tempo, beat-by-beat. Embodiments use time-scale modification techniques such as those described in "A Review of Time-scale Modification of Music Signals" (J. Driedger and M. Müller. Appl. Sci. 2016, 6, 57) to ensure that the pitch of each altered beat of songB remains true to the pitch of the original songB. After beat-matching, beats of songA and beats of songB can be grouped into 4-beat, 8-beat, or m-beat chunks. For example, the beats of each song may be grouped into events that are 8 quarter notes long.

Once songA and songB have been parsed 200 and beat matched 202, variation algorithms 204 are applied to each of them, and they are combined using a mash-up algorithm 206.

Mash-Up Algorithms: MUiMUv

With reference to FIG. 2, one general aspect of the present invention includes a mash-up algorithm 206. The muMap and MUiMUv algorithms are two such mash-up algorithms. These methods assume that each of songA and songB includes two separate tracks, referred to generically herein as the instrumental and vocal tracks. According to the disclosed methods, each of the tracks for each of songA [1] and songB [2] is parsed [3, 4], for example according to each pitch/chord event (default parsing) or in groups of eighth notes, e.g., 8 eighth-note parses (i.e., events). As discussed above, beat matching [5, 6] is applied to songB, and appropriate parse times [7, 8] are applied to both tracks of both songs.

Then, improved chaotic mapping is applied [9]-[13] separately to the instrumental and vocal tracks of songA and songB to create variations of the tracks [14]-[17], after which improved chaotic mapping is used to combine elements from the two songs [18] by, in the case of MUiMUv, substituting parses from the instrumental track of songB in place of parses of the instrumental track of songA, then substituting parses from the vocal track of songB in place of parses of the vocal track of songA, and combining these together. Or in the case of muMap, by combining tracks 14-17 according to a "map" or template of possible textures, e.g., instrumental and vocal combinations, as discussed in more detail below.

In embodiments of MUiMUv, wherever a changed parse occurs due to improved chaotic mapping, e.g., in the jth parse of songA's instrumental track, the commensurate jth parse of songB's instrumental is inserted. Similarly, wherever a changed parse occurs in songA's vocal track, i.e., when $j \neq g(j)$ for any jth parse, the jth parse of songB's vocal track is inserted. In this way, an instrumental track that mixes the two songs' instrumental tracks and a vocal track that mixes the two songs' vocal tracks are created. Then these two tracks are combined to produce a mash-up of the two songs [19], which is presented to a user. For example, the mash-up can be directed to an amplifier [20], a mixer [21], and speakers [22] for audio presentation.

The name "MUiMUv" that is used to refer to this general aspect comes from how the algorithm works. Improved chaotic mapping mashes two different instrumental tracks to create an "Instrumental Mash-up" track "MUi", and mashes two different vocal tracks to create a vocal mash-up track "MUv", after which the two resulting tracks (MUi and MUv) are combined to produce the final mash-up (MUi+MUv).

Figure 4:
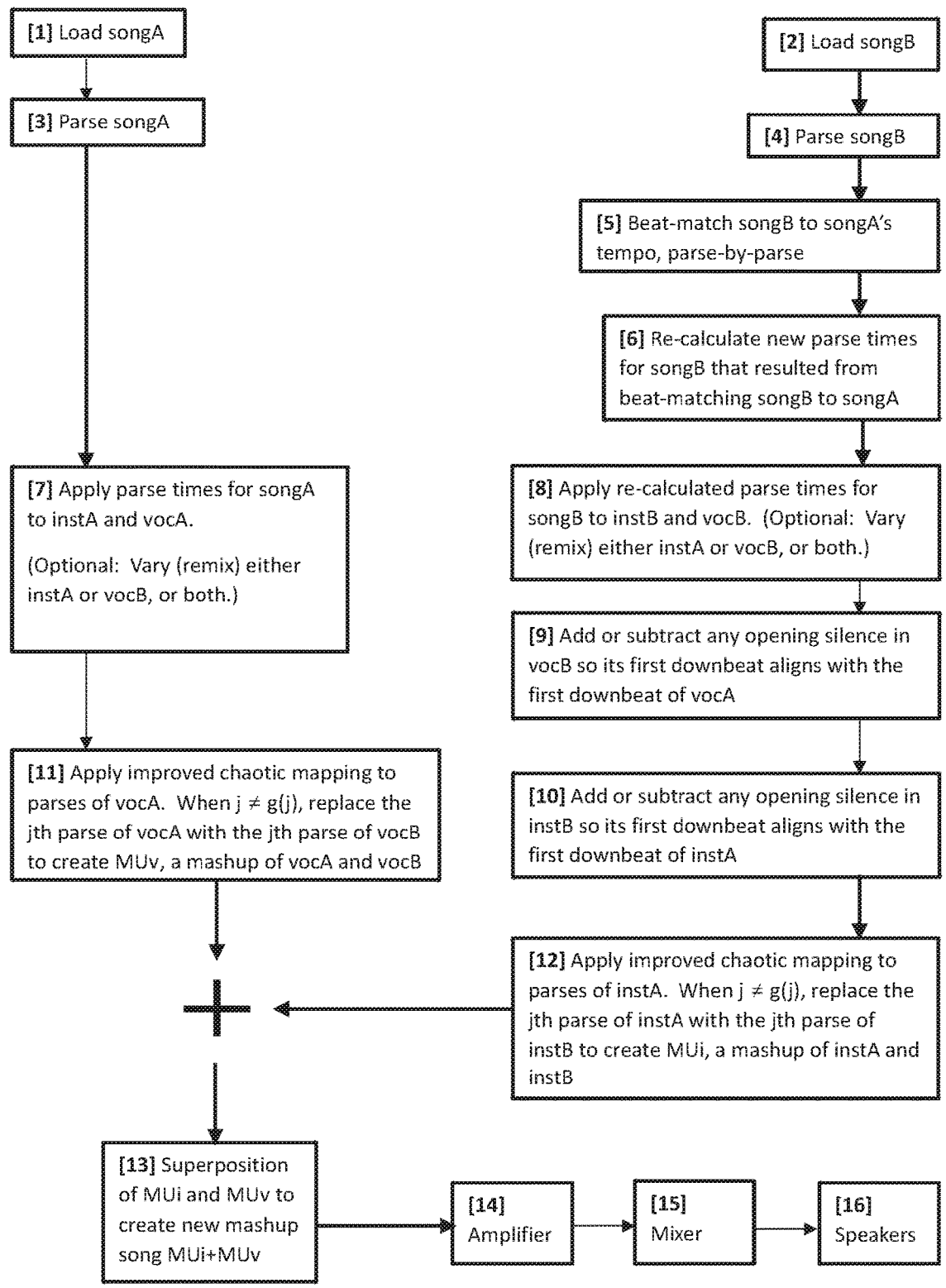
FIG. 4 is a flow diagram that illustrates the MUiMUv algorithm used in embodiments of the present invention.

FIG. 4 illustrates the MUiMUv algorithm in greater detail. First, the user loads two songs, preferably in the same key, e.g., C minor, (Blocks [1] and [2]). SongA and songB are each parsed into events, e.g., each parse can be composed of 4 quarter beats+2 extra quarters (to provide audio overlap), (Blocks [3]-[4]). Using a ratio provided by the relative lengths of the individual beats, songB is beat-matched to songA, parse-by-parse, according to any number of beat-matching algorithms, such as those described in Driedger and Müller above, (Block [5]).

In Blocks [6]-[8], the parse times found for songA are applied to the instrumental track of A (instA), and the new re-calculated parse times found for the beat-matched songB are applied to the instrumental track of B (instB). Similarly, the parse times found for songA are applied to the vocal track of A (vocA), and the new re-calculated parse times found for the beat-matched songB are applied to the vocal track of B (vocB).

Before improved chaotic mapping can be applied in Blocks [11] and [12], the two vocal tracks have to be aligned so that, for example, the vocals in songB enter where the vocals in songA would have entered, (or the vocals in songB can enter over instA at the moment in time vocB would have entered in songB.) Usually silence precedes any vocal audio on a vocal track because songs usually start with an instrumental introduction. To measure the duration of any silence preceding the vocal entry on vocA, a threshold can be set to identify in which parse the voice(s) starts as well as the duration of the preceding silence. Then silence can be either added to, or removed from, vocB, for example in quantities equal to the length of a quarter note, until the initial silence of vocB equals the same number of quarter note events as the initial silence of vocA, presuming that it is desired for vocB to align with vocA, (Block 9). Similarly, the first downbeat of instB can be aligned with the first downbeat of instA, (Block 10).

Once the two vocal tracks are aligned, parse-by-parse, improved chaotic mapping is applied to substitute parses from vocB in place of parses of vocA, (Block 11). Whenever $j \neq g(j)$ for a given set of initial conditions, the jth parse of vocA is replaced by the jth parse of vocB to create a new vocal track "MUv".

Similarly, once the two instrumental tracks are aligned, parse-by-parse, improved chaotic mapping is applied to the parses of instA. Whenever $j \neq g(j)$, typically for a different set of initial conditions than those used for mashing the vocals, the jth parse of instA is replaced by the jth parse of instB to create a new instrumental track "MUi", (Block 12).

Finally, the mashed instrumental track MUi is combined with the mashed vocal track MUv to produce the final mash-up, MUi+MUv (Block [13]), which is presented to a user, for example by directing the mash-up to an amplifier, mixer, and speakers, (Blocks [14]-[16]).

It will be understood that the scope of the present invention includes many other mash-up methods that are variations of the MUiMUv method. For instance, MUi could be produced by alternating parses of instA with parses from instB so that every other parse of MUi comes from instA and the intervening parses are derived from instB. MUv could be made in a similar manner. Then MUi and MUv could be superposed to give the mash-up comprising MUi+MUv.

As another example, "MUiavbMUibva" uses improved chaotic mapping, in conjunction with a set of parameters including initial conditions, to mash instA with vocB to produce a first mash-up MU1. Then, improved chaotic mapping is used to mash instB with vocA using improved chaotic mapping to produce a second mash-up MU2. Lastly, improved chaotic mapping is used to mix MU1 with MU2 to produce a final mash-up MU3. For MU1, the alignment can be adjusted so that vocB aligns with instA exactly where vocA would have entered in songA. For MU2, the alignment can be adjusted so that vocA aligns with instB exactly where vocB would have entered in songB.

In embodiments, the overall structure of songA is preserved by adjusting MUiMUv so that only the first verse ("verse1") of songA mashes with verse1 of songB, verse2 mashes with verse2, and the hooks mash as well. Embodiments incorporate machine learning and signal processing methods that allow automated identification of the structures of songA and songB.

MUiMUv can create a mash-up that can be combined with a graphical element and forwarded to at least one recipient, where the graphical element can be, for example, any of a graphical image; a video or part of a video; a film or part of a film; a video game or part of a video game; a greeting card or part of a greeting card; a presentation slide element or presentation slide deck; a slide presentation created by a presentation software application, wherein the presentation software application is configured to perform the steps of any of the MUiMUv algorithms disclosed herein; an element of a storyboard that describes a proposal for a musically accompanied graphical work such as a musically accompanied video.

The MUiMUv method can also be applied to inputs associated with a website or software program so that each time a user visits a designated page of the website or the software program, the website or software program is configured to operate on the inputs to produce a mash-up and play/present it to the user.

MUiMUv can also be implemented in a digital device that is installed for example in a greeting card that is configured to produce and present a mash-up when the greeting card is opened. Such a digital device can also be included within a toy, an MP3 player, a cellular telephone, or a hand-held or wearable electronic device. The digital device can produce a new mash-up of the inputs each time the inputs are accessed, or automatically from a plurality of input songs.

MUiMUv can be embedded in an application or computing module running in hardware or software on a hand-held or wearable electronic device, or on a network to a handheld or wearable electronic device, any of which are configurable to play a new mash-up or variant of a mash-up of input musical compositions each time input musical compositions are selected, from a plurality of inputs supplied by the application or other users, manually or automatically, including mash-ups successively created in a chain of users or machines. The MUiMUv method can also be practiced by a computing module included in a hand-held or wearable electronic device wherein a plurality of tracks from input musical compositions are accessible to a hand-held or wearable electronic device, and the hand-held or wearable electronic device is configured to enable the user to access subsets of the tracks as the inputs and to create therefrom a mash-up.

muMap

The MUiMUv algorithm and its variants as described above are particularly suited for creating mash-ups of songs that have the same or similar structures. Another general aspect of the present invention incorporates a mash-up algorithm referred to herein as muMap, which is highly effective for creating mash-ups of songs that have different structures, for example if songA proceeds from verse1 to a hook, whereas songB proceeds from verse1 to verse2 and then to a hook, so as to create a mash-up with an overall structure that can be readily discerned by a listener.

After parsing and beat-matching, the "muMap" algorithm uses the vocal and instrumental tracks of songA and songB to create a mash-up. In its simplest form, it offers a series of textures progressing from one track to two tracks, then three, and so forth. In embodiments, this continues until the textures include all of the tracks of all of the songs. For example, if a mash-up is created using two songs as inputs with two tracks per song, then in embodiments the applicable textures are one track, two tracks, three tracks, and finally four tracks. After all four tracks enter, the texture reduces to different combinations of tracks, chosen to provide contrast to what came before and what follows.

An example of an application of the muMap algorithm is presented in FIG. 5A. Each track in the figure is parsed in groups of 8 quarter notes and arranged according to a desirable structural map as shown in the figure. According to the example of FIG. 5A, the first 5 blocks 500 comprise the Introduction section of the mash-up song. Each block, except perhaps the opening block, lasts for a duration of 8 quarter notes.

After the Introduction, different combinations of tracks ensue, as shown in FIG. 5A, until the end. The desired end can be achieved by a Coda where the different tracks successively disappear till only one is left, fading out to the end.

As shown in FIG. 5A, each different texture (502-510) occurring after the Introduction lasts for at least the duration of 16 quarter notes, except for 510, where (1) the vocA-vocB-instA-instB combination of the penultimate Block 27 has a duration of 8 quarter notes only, and (2) the Coda or "continued track combinations" of Blocks 28, . . . , Final Block, can lead to the end of the mash-up song.

To ensure alignment after parsing and beat-matching, vocB can enter at an elapsed time determined by when it originally entered in songB. This gives three advantages:
1) for any songA, vocB will always enter in a different place over instA, according to each different songB being mashed with songA, thus providing variety, and
2) any silence normally preceding the entrance of the voice of vocB can be left intact; vocB simply overlays instA assuming each song is in common time and instA starts on a downbeat, assumptions that typically hold in popular music. The process of overlaying vocB (including any opening silence) on top of instA will preserve any upbeat that may occur in vocB, automatically aligning the first downbeat in vocB with a strong beat in instA, as shown in FIG. 5B.
3) assuming both songs are in duple meter and instA starts on a downbeat (both common occurrences in popular songs), the process of overlaying vocB (including any opening silence) on top of instA can still maintain any upbeat quality that may occur in vocB, automatically aligning the first downbeat of vocB with a downbeat or strong beat in instA, for 2/4 or 4/4 meter, respectively.

Another example of the application of the muMap algorithm is presented in Table 1 below. According to this example, all blocks, except perhaps the $0^{th}$ block (opening block), consist of parses equivalent to 8 quarter-note groups. Block 1 is defined as the block containing the parse where vocB enters. To identify the parse where vocB enters, a threshold value can be set. Once vocB crosses that threshold, the parse where the vocal(s) of vocB starts is considered Block 1.

TABLE 1 muMap with changing states

| Opening (or $0^{th}$) Block | Block 1 | Block 2 | Block 3 | Block 4 |
|---|---|---|---|---|
| if an upbeat of vocB occurs in this block, | vocB(assuming no upbeat) then a downbeat of vocB occurs here. | vocB | vocA vocB | vocA vocB |
| instA (instA proceeds till vocB enters. Block 1 is defined by the entrance of the voice, but if vocB has an upbeat, the upbeat would actually occur in this zeroth block, thus making it count as Block 1.) | instA | instA | instA | instA |
| | | | | instB |
| | Parse length: 8-quarter-note group | Parse length: 8-quarter-note group | Parse length: 8-quarter-note group | Parse length: 8-quarter-note group |

After the Introduction section comprising Blocks 0-4, improved chaotic mapping can operate on the parses of songA, e.g., grouped in 16-quarter-note parses corresponding to the length of each different texture given by muMap, to determine when the current texture should move to the next textured 'state.' In embodiments whenever j≠g(j), the current state moves to the next state according to a predetermined texture order, such as the order depicted in the muMap of FIG. 5A. Following the Introduction, muMap changes texture every 2 blocks until 510, with the exception of Blocks 19-22 which consist of vocA-instA.

For instance, after the Introduction (Blocks 0-4) in the muMap of FIG. 5A, if j=g(j) for Blocks 5-6 and Blocks 7-8, but j≠g(j) for Blocks 9-10, the vocA-instB will prevail through the four Blocks 5-8, but the texture will change to vocA-vocB-instB in Blocks 9-10, according to the predetermined texture order of the muMap of FIG. 5A.

Or, once all 4 tracks have entered (constituting the end of the Introduction), improved chaotic mapping can be used to shift from one state to another, not in any predetermined order, but according to a state implementation table, such as Table 2 below, which compares j vs. g(j) with respect to each of the three x, y, and z variables, where 0 signifies no change, i.e., when j=g(j), and 1 signifies change, i.e., when j≠g(j).

Figure 1A:
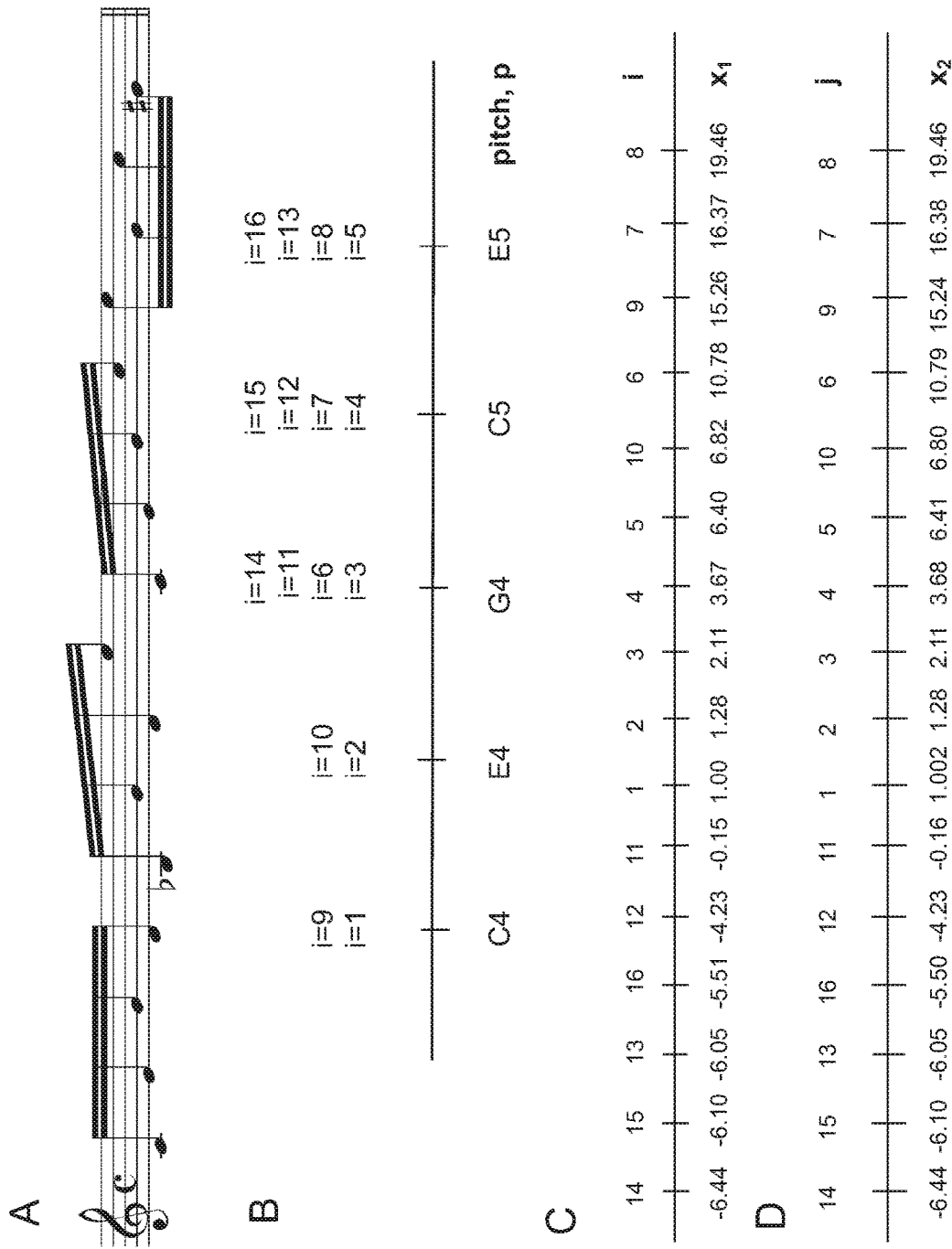
FIG. 1A illustrates a prior art example of the application of a Hole Template method previously disclosed in U.S. Pat. Nos. 9,286,876 and 9,286,877 to a musical example, where the illustrated Hole Template method is also used in embodiments of the present invention.
Figure 1A:
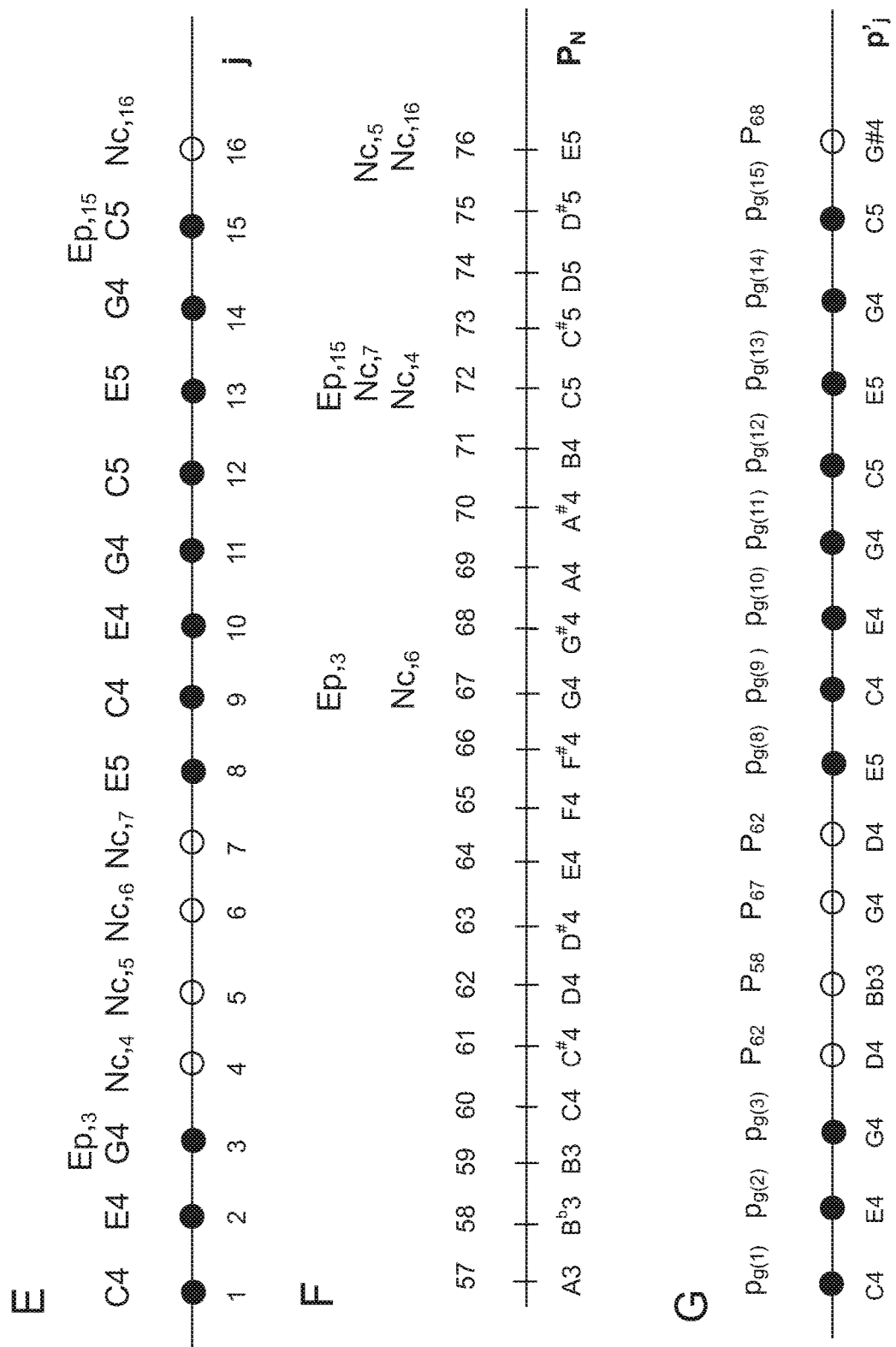
Figure 1B:
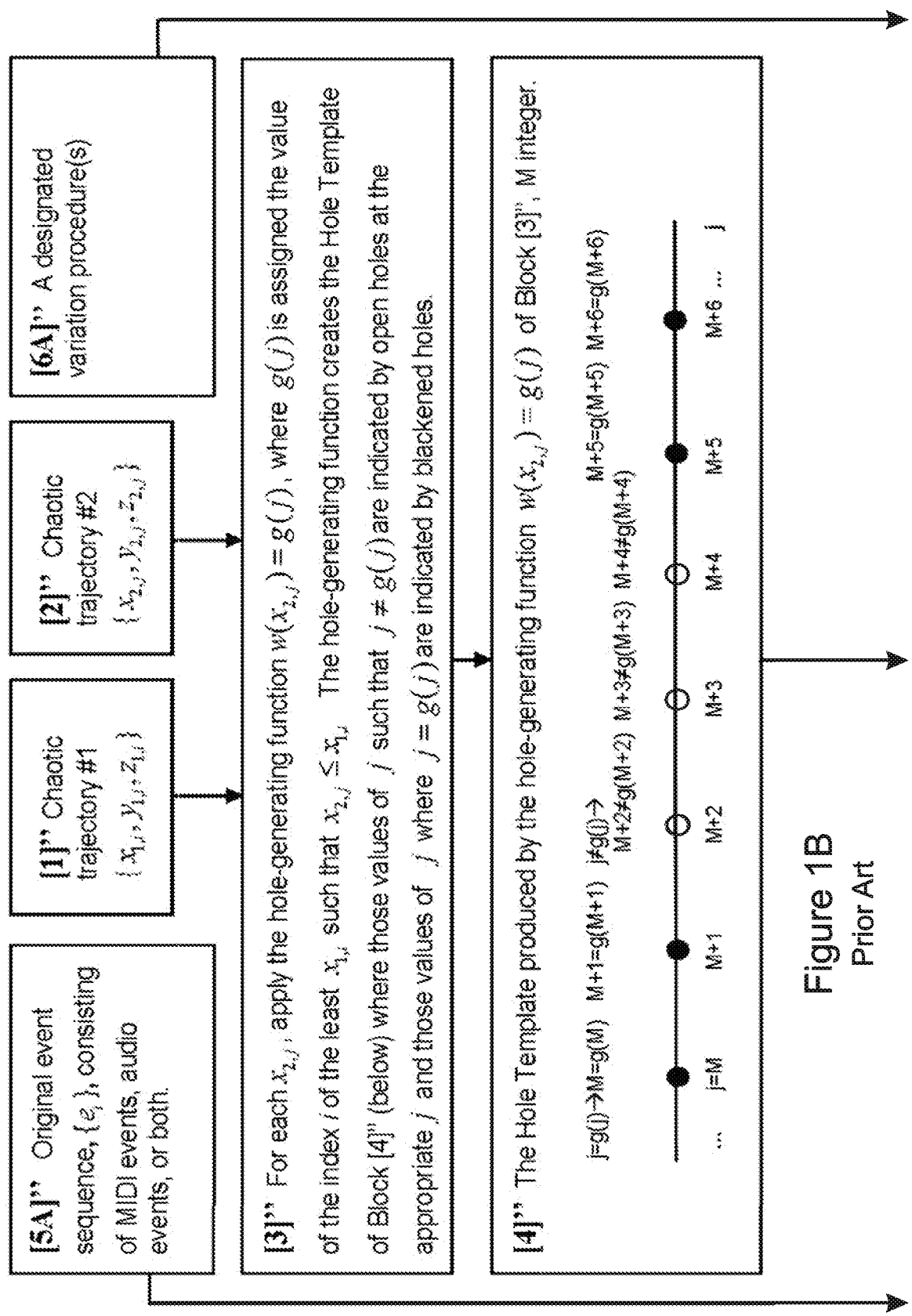
FIG. 1B is a flow diagram illustrating application of the Hole Template method of FIG. 1A to an event sequence that can consist of MIDI events, audio events, or both.

In this example, to create the State Implementation Table, improved chaotic mapping operates on a list of events, e.g., the 16-quarter-note parses of songA that occur after the Introduction, and calculates j vs. g(j) not only with respect to the x-variable (as occurs in FIG. 1A), but also with respect to y- and z-variables. (The Lorenz trajectories are 3-dimensional.) Then the values of j and g(j) found from the mapping applied with respect to each variable are compared: if j=g(j), "0" is assigned to the jth event; if j≠g(j), "1" is assigned to the jth event. For 3 variables, there are 8 possible combinations of "0s" and "1s". Each of these can be associated with a "state." For example, for j=1 (signifying the first parse of 16-quarter-notes that will follow the Introduction in the mash-up song), if the j and g(j) values found from the mapping with respect to the x-variable are equal (resulting in "0"), and the j and g(j) values found from the mapping with respect to the z-variable are equal (also resulting in "0"), but the j and g(j) values found from the mapping with respect to the y-variable are not equal (resulting in "1"), the implemented state will be State No. 1 (010), i.e., vocA coupled with instA.

TABLE 2

State Implementation Table

| State No. | X j vs g(j) | Y j vs g(j) | Z j vs g(j) | State Implemented |
|---|---|---|---|---|
| 1 | 0 | 1 | 0 | VocA, InstA |
| 2 | 0 | 0 | 1 | VocA, InstB |
| 3 | 1 | 0 | 0 | VocB, InstB |
| 4 | 1 | 1 | 0 | VocA, InstA, InstB |
| 5 | 0 | 1 | 1 | VocB, InstA |
| 6 | 1 | 0 | 1 | VocB, InstA, InstB |
| 7 | 1 | 1 | 1 | If 111, then allow vocA-vocB-instA or vocA-vocB-instB for only 16-quarters by selecting the one whose inst occurred in the Block immediately preceding the change in state |
| 8 | 0 | 0 | 0 | Continue prior state for 8 more quarters unless the prior state is State 4 or State 6. If State 4, then go to State 2. If State 6, then go to State 5. |

Figure 3:
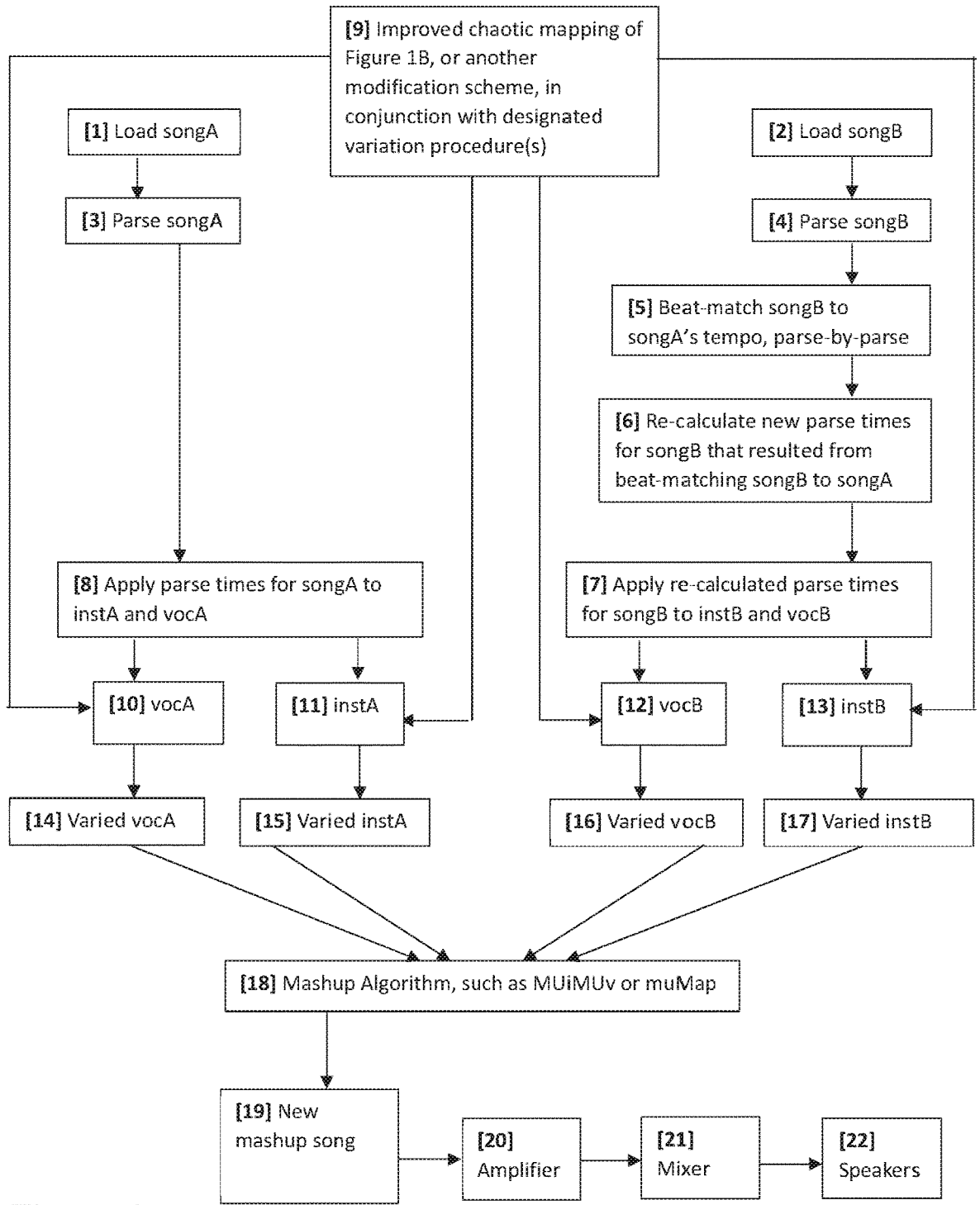
FIG. 3 is a flow diagram that illustrates a method of creating mash-ups according to an embodiment of the present invention that is adapted for application to audio and other recorded events.

Improved chaotic mapping can also be used to vary individual tracks comprising the original songA and songB, as shown earlier in FIG. 3 (Blocks 10-13) and alluded to in FIG. 4 (Blocks [7] and [8]). For instance, whenever j≠g(j), the jth event of instA can be replaced by the g(j)th event of instA. Ditto for varying instB. Initial conditions of 2, 2, 2 will virtually guarantee much mixing of each instrumental track.

But to ensure that the same instrumental variations do not occur in every mash-up that results from using songA as the first song, improved chaotic mapping can operate on the parses of songB in order to apply the resulting j vs. g(j) values to the parses of instA to determine which g(j)th parses of instA will substitute for the associated jth parses of instA. In this way, variations of instA will always differ according to which songB is being mashed with songA.

The varied individual tracks can also incorporate signal processing techniques, such as convolution, as well as effects sometimes used by professional "disk jockey" ("DJ") music presenters, such as scratching, increasing tempo, decreasing tempo, filtering, and combinations thereof, according to improved chaotic mapping's j vs. g(j) values and an appropriate implementation table. Again, running improved chaotic mapping on the parses of songB to produce the j vs. g(j) values to be applied to the parses of songA will ensure distinct variations of songA tracks from mash-up to mash-up. In the Change Implementation Table (Table 3) below, which compares j vs. g(j) across all 3 variables of x, y, and z, where 0 signifies no change, i.e., when j=g(j), and 1 signifies change, i.e., when j≠g(j), the term "convolve" refers to the convolution of song tracks such as instA and instB, while "8×" refers to decreasing the tempo 8-fold for the first eighth-note of whichever instrumental track is being varied.

To create the Change Implementation Table of Table 3, improved chaotic mapping operates on a list of events, e.g., the 16-quarter-note parses of songB that start commensurately with the start time of Block 5 in FIG. 5A, and then applies the resulting j vs. g(j) values to the parses of instA that follow the Introduction (starting with Block 5), so that parses of instA can be identified that will be altered by an effect. Which effect to be applied to a given parse of instA marked for alteration is then determined by running improved chaotic mapping on the 16-quarter-note parses of songA that follow the Introduction, to find the j vs. g(j) values not only with respect to the x-variable (as occurs in FIG. 1A), but also with respect to y- and z-variables. Then the values of j and g(j) found from the mapping with respect to each variable are compared, whereby if j=g(j), "0" is assigned to the jth event; if j≠g(j), "1" is assigned to the jth event.

As noted earlier, 8 possible combinations of "0s" and "1s" exist for the 3 variables. Each of these can be associated with a "change" to instA. For example, for any given parse of 16 quarter notes that follows the Introduction in the mash-up song generated by muMap, suppose the j and g(j) values found from the mapping with respect to the x-variable are not equal (resulting in "1"), but the j and g(j) values found from improved chaotic mapping with respect to the y- and z-variables are equal (resulting in two "0s"), the implemented state will be Change No. 3 (100), i.e., convolve instA and instB for the entire parse+decrease tempo 8× for the first eighth of the parse. This change is then reflected in the instA component of muMap. Effects changes such as those determined by Table 3 can also be applied to inputs for other mash-up methods, including MUiMUv and its variants.

TABLE 3

Change Implementation Table

| Change No. | X j vs g(j) | Y j vs g(j) | Z j vs g(j) | Change Implemented |
|---|---|---|---|---|
| 1 | 0 | 1 | 0 | Silence 1$^{st}$ half of parse, play 2$^{nd}$ half unchanged |
| 2 | 0 | 0 | 1 | Apply 8× for 1$^{st}$ half of the parse, play 2$^{nd}$ half unchanged |
| 3 | 1 | 0 | 0 | Convolve instA and instB for the entire parse + decrease tempo 8× for the first eighth of the parse |
| 4 | 1 | 1 | 0 | Play 1$^{st}$ half of the parse unchanged, apply 8× to 2$^{nd}$ half |
| 5 | 0 | 1 | 1 | Convolve inst with itself for 1$^{st}$ half of the parse, play 2$^{nd}$ half unchanged |
| 6 | 1 | 0 | 1 | Play 1$^{st}$ half of the parse unchanged, convolve inst with itself for 2$^{nd}$ half |
| 7 | 1 | 1 | 1 | Convolve instA with instB for the entire parse |
| 8 | 0 | 0 | 0 | Apply 8× for the entire parse |

A Coda can be added to the mash-up as well and can include n parses of 8-quarters each, depending on the state of the mash-up in the parse immediately preceding the desired Coda.

Assuming an 8-quarter note parse size, if improved chaotic mapping returns a state having only two lines (tracks) for the mash-up parse occurring right before the start of the Coda, then those 2 lines can continue for 16 more quarter notes, after which the upper line is eliminated, and the lower track continues for 8 more quarters, then fades over the next 8 quarters. Here, the Coda includes four 8-quarter-note parses, i.e., n=4.

If improved chaotic mapping returns a state of three lines (tracks) for the mash-up parse occurring right before the start of the Coda, then those 3 lines can continue for 16 more quarter notes, provided two of the lines are not vocA and vocB, in which case instA or instB replaces one of the vocal tracks according to which instrumental track was not present in the previous state. Next, an instrumental track is eliminated, leaving the mash-up with one vocal and one instrumental for another 16 quarter notes. Finally, the vocal track can be eliminated such that the remaining instrumental track is left to play for another 8 quarter notes with a fade at the end, resulting in a Coda of five 8-quarter-note parses (n=5).

If improved chaotic mapping returns four lines (tracks) for the mash-up parse occurring right before the start of the Coda, then vocB can be eliminated for the first parse of the Coda. For each successive 8-quarter-note parse of the Coda, the following steps can be taken:
Eliminate instA (8-quarter-note parse)
Eliminate vocA (8-quarter-note parse)
Fade instB (8-quarter-note parse) to conclude the mash-up
Thus, the Coda would comprise four 8-quarter-note parses (n=4).

Improved muMap

Yet another general aspect of the present invention incorporates a mash-up algorithm referred to herein as the "improved muMap." FIG. 6A illustrates an example of the improved muMap algorithm. Like FIG. 5A, it has an Introduction 600 that includes an opening block of 8 quarters of instA (with more or less quarters possible), followed by successive entrances of vocB, vocA, and instB. But the improved muMap eliminates the potential cacophony of vocA and vocB sounding together for too long, a problem that can arise in some mash-ups. The improved muMap also employs trimming of instA for excessively long durations before vocB enters. It adds a Rotating Change Implementation Table so that different effects occur with different mash-ups generated by pairings with songA. The x, y, z values for the Rotating Change Implementation Table are determined by running improved chaotic mapping on, e.g., the 8-quarter-note parses of songA.

Trimming instA: It turns out that sometimes the length of instA, before vocB enters, is excessive. For example, the Michael Jackson song "Thriller" has an instrumental introduction that lasts about 1 minute and 24 seconds. To remedy this, the following steps can be applied: once the complete mash-up is made, vocB can be checked to see if it enters on, or after, a specified threshold time, such as the 34th eighth note. If so, the two instA parses, occurring before the parse where vocB enters, can be identified, i.e., instA Parse 1 and instA Parse 2 in FIG. 6B. Any instA occurring before the instA Parse 1, i.e., before MU parse1, can be eliminated, where MU stands for "mash-up."

It should be noted that, while many of the examples presented above are directed to mash-ups that combine an A song with only one B song, in embodiments the disclosed method can be used to create mash-ups between an A song and a plurality of B songs.

Rotating Change Implementation Table

As described above, the instrumental track from songA can be varied in each mash-up by running improved chaotic mapping on the parses of songB and applying the j, g(j) values from songB to the parses of instA to identify those parses of instA that will acquire an effect (whenever j≠g(j)). Then improved chaotic mapping operates on parses of songA to determine which effect (or which change) will be applied. But if extreme initial conditions are used when running improved chaotic mapping on the parses of songA, e.g., [2, 2, 2], then virtually every parse of instA will have j≠g(j) for all 3 variables, resulting in 111 for every parse, where the three 1's signify j≠g(j) for each of the 3 variables x, y, and z. This means the effect shown in row 7 of Table 3 above (convolve instA with instB for the entire parse), will be applied to each parse of instA identified to acquire an effect. To avoid this redundancy, extreme initial conditions can be eschewed in favor of initial conditions closer to [1, 1, 1] for setting up the j vs. g(j) values across x, y, and z, that are used to select a change from the change implementation table.

However, another problem can arise. To assign an effect to a "changing" parse in instA, improved chaotic mapping operates on the parses of songA to generate the j vs. g(j) values, but that means that the same effects will occur in every instA as it appears in every mash-up of songA with any songB. So to ensure that instA substantively varies in each mash-up with a songB, an implementation table can be rotated for each AB1, AB2, AB3, . . . mash-up, up to some maximum such as 8 B songs, where ABk refers to a mash-up of songA with songBk, where songBk is one of a group of N songs, indexed by k=1 to N, with which songA is being combined to form mash-ups. Where the group of B songs is greater than a specified maximum, such as 8 B songs, a wraparound can be used to start the rotation over again.

For example, suppose the Rotating Change Implementation table of Table 4A is used for varying instA in the mash-up of songA with songB1, which is the first of a plurality of B songs, each of which is in the same key as songA, or is in a related key, to produce the new mash-up AB1.

TABLE 4A

Rotating Change Implementation Table

| Change No. | X j vs g(j) | Y j vs g(j) | Z j vs g(j) | Change Implemented |
|---|---|---|---|---|
| 1 | 0 | 1 | 0 | Silence 1$^{st}$ half of parse, play 2$^{nd}$ half unchanged |
| 2 | 0 | 0 | 1 | Apply 8× for 1$^{st}$ half of the parse, play 2$^{nd}$ half unchanged |
| 3 | 1 | 0 | 0 | Convolve instA and instB for the entire parse + decrease tempo 8× for the first eighth of the parse |
| 4 | 1 | 1 | 0 | Play 1$^{st}$ half of the parse unchanged, apply 8× to 2$^{nd}$ half |
| 5 | 0 | 1 | 1 | Convolve inst with itself for 1$^{st}$ half of the parse, play 2$^{nd}$ half unchanged |
| 6 | 1 | 0 | 1 | Play 1$^{st}$ half of the parse unchanged, convolve inst with itself for 2$^{nd}$ half |
| 7 | 1 | 1 | 1 | Convolve instA and instB for the entire parse |
| 8 | 0 | 0 | 0 | Apply 8× for the entire parse |

Then, to vary instA for the second mash-up, AB2, the 'Change Implemented' column can be rotated (vertically shifted by one row) as shown in Table 4B, thereby guaranteeing that instA will not acquire the exact same set of effects in AB2 as it did in AB1.

TABLE 4B

Rotating Change Implementation Table showing an exemplary rotation

| Index No. | X j vs g(j) | Y j vs g(j) | Z j vs g(j) | Change Implemented |
|---|---|---|---|---|
| 1 | 0 | 1 | 0 | Apply 8× for the entire parse |
| 2 | 0 | 0 | 1 | Silence 1$^{st}$ half of parse, play 2$^{nd}$ half unchanged |
| 3 | 1 | 0 | 0 | Apply 8× for 1$^{st}$ half of the parse, play 2$^{nd}$ half unchanged |
| 4 | 1 | 1 | 0 | Convolve instA and instB for the entire parse + decrease tempo 8× for the first eighth of the parse |
| 5 | 0 | 1 | 1 | Play 1$^{st}$ half of the parse unchanged, apply 8× to 2$^{nd}$ half |
| 6 | 1 | 0 | 1 | Convolve inst with itself for the 1$^{st}$ half of the parse, play 2$^{nd}$ half unchanged |
| 7 | 1 | 1 | 1 | Play 1$^{st}$ half of the parse unchanged, convolve inst with itself for the 2$^{nd}$ half |
| 8 | 0 | 0 | 0 | Convolve instA with instB for the entire parse |

The above strategies for trimming instA, rotating the change implementation table, and applying changes to instA dictated by j vs. g(j) outcomes based on songB, can be applied to a full realization of the improved muMap, whereby, for example, each track is parsed in groups of 8 quarter notes and arranged according to the improved muMap, shown in FIG. 6A. The first 5 blocks 600 comprise the Introduction section of the mash-up song, followed by a sequence of textures 602-610 that differs from the earlier muMap. Specifically, Blocks 17 and 18 (in 606) differ from the earlier muMap in that vocA has been removed; Blocks 21-22 (in 608) differ from the earlier muMap in that instB is added to both blocks.

Embodiments of this general aspect include, among others, the following variants on the improved muMap:
1. Improved muMap with varied instrumental tracks produced by improved chaotic mapping operating on the parses of each instrumental track and making g(j) substitutions for jth parses whenever j≠g(j).
2. Improved muMap with signal processing effects varying the instrumental tracks according to a Rotating Change Implementation Table.
3. Improved muMap with variation by both g(j) substitution and signal processing effects.
4. Improved muMap with Introduction section preserved, i.e., without any changes to the instrumental tracks, then incorporating step 1 above.
5. Improved muMap with Introduction section preserved, i.e., without any changes to the instrumental tracks, then incorporating step 2 above.
6. Improved muMap with Introduction section preserved, i.e., without any changes to the instrumental tracks, then incorporating step 3 above.

For variant (1) above, it is necessary to vary instA by applying improved chaotic mapping to parses of songB, for example 4-quarter-note length events, and then applying the j vs. g(j) values to instA. When j≠g(j) for songB parses, the g(j)th element of instA substitutes for the jth parse of instA to create jgjVarInstA. Similarly, to vary instB, improved chaotic mapping operates on parses of songA and applies the j vs. g(j) values to instB, whereby if j≠g(j), the g(j)th element of instB substitutes for the jth element of instB, to create jgjVarInstB. Then jgjVarInstA is substituted for instA in the improved muMap and jgjVarInstB is substituted for instB in the improved muMap.

For variant (2) above, improved chaotic mapping is applied to parses of songB, for example to 4-quarter-note length events, to determine which parses of instA will change, i.e., whenever j≠g(j) for the improved chaotic mapping applied with respect to one variable, the x-variable. How those instA parses will change is then determined by running improved chaotic mapping on the parses of songA producing a set of j≠g(j) comparisons with respect to each x-, y-, and z-variable associated with each parse of songA. For each jth parse of instA that is to change, the Rotating Change Implementation Table specifies a signal processing effect, according to the binary numbers corresponding to the j vs. g(j) results for each x-, y-, and z-variable associated with each parse of songA, as depicted in FIGS. 4A and 4B.

Similarly, improved chaotic mapping is applied to parses of songA, for example 4-quarter-note length events, to determine which parses of instB will change, i.e., whenever j≠g(j). How those instB parses will change is then determined by running improved chaotic mapping on the parses of songB to find the j vs. g(j) values, not only with respect to the x-variable but also with respect to y- and z-variables. Then the values of j and g(j) returned by the mapping with respect to each variable are compared, whereby if j=g(j), a "0" is assigned to the jth event; if j≠g(j), "1" is assigned to the jth event. Since 8 possible combinations of 0s and is exist for the three variables, a Rotating Change Implementation Table similar to Table 4A and Table 4B can be used to determine which effect is assigned to each parse of instB that is to change.

For variant (3) above, the steps for (1) are performed first, i.e., instA is varied by applying improved chaotic mapping to the parses of songB and then applying the j vs. g(j) values to instA. When j≠g(j) for the parses of songB, the g(j)th element of instA substitutes for the jth element of instA, to create jgjVarInstA. Similarly, to vary instB, improved chaotic mapping operates on the parses of the songA and applies the resulting j vs. g(j) values to instB when j≠g(j) for songA parses, the g(j)th parse of instB substitutes for the jth parse of instB, to create jgjVarInstB.

Then the steps for variant (2) are implemented, i.e., improved chaotic mapping is applied to parses of songB to determine which parses of jgjVarInstA will change, i.e., whenever j≠g(j). How those jgjVarInstA parses will change is then determined by running improved chaotic mapping on the parses of songA to find the j vs. g(j) values, not only with respect to the x-variable, but also with respect to y- and z-variables. Then the values of j and g(j) returned by the mapping with respect to each variable are compared, whereby if j=g(j), a "0" is assigned to the jth event; if j≠g(j), "1" is assigned to the jth event. Since 8 possible combinations of 0s and 1s exist for the three variables, a Rotating Change Implementation Table similar to Table 4A and Table 4B can be used to determine which effect is assigned to each jgjVarInstA parse identified for change in the AB1 mash-up. Then the table can rotate for the AB2 mash-up so that a new effect is associated with each row combination of 0s and 1s in the table.

Similarly, improved chaotic mapping is applied to parses of songA to determine which parses of jgjVarInstB will change, i.e., whenever j≠g(j). How those jgjVarInstB parses will change is then determined by running improved chaotic mapping on the parses of songB to find the j vs. g(j) values, not only with respect to the x-variable, but also with respect to y- and z-variables. Then the values of j and g(j) returned by the mapping with respect to each variable are compared, whereby if j=g(j), a "0" is assigned to the jth event; if j≠g(j), "1" is assigned to the jth event. Since 8 possible combinations of 0s and 1s exist for the three variables, a Rotating Change Implementation Table similar to Table 4A and Table 4B can be used to determine which effect is assigned to each jgjVarInstB parse identified for change in the AB1 mash-up. Then the table can rotate for the AB2 mash-up so that a new effect is associated with each row combination of 0s and 1s in the table.

Variants (4), (5), and (6) above each preserve the Introduction of the improved muMap without varying any of the vocal or instrumental tracks, while applying the variation possibilities offered by variant (1) (g(j) substitution), variant (2) (Rotating Change Implementation Table), and variant (3) (g(j) substitution plus Rotating Change Implementation Table), respectively, to the instrumental tracks.

Other improved muMap variants are included in the scope of the invention that further change the improved muMap of FIG. 6A, such as the variant illustrated in FIG. 7.

Applying Improved Chaotic Mapping to Vary the Structure of muMap for Each Mash-Up: Left/Right muMap (LRmuMap)

In some cases, a user may wish to have more 'paths' through a structural mash-up other than those presented in FIG. 5A, FIG. 6A, and FIG. 7. For example, users might appreciate a variety of possible textural structures for the Introduction section of a mash-up, so that every mash-up does not open with the same instA/instA-vocB/instA-vocB-vocA/instA-vocB-vocA-instB structure. Accordingly, the present invention includes a family of embodiments referred to herein as "LRmuMap," in which improved chaotic mapping is used to select different structures for textural changes.

Four musical options for the 'Introduction' of a muMap mash-up according to the LRmuMap method are shown in FIG. 8A. Any one of these options will provide a musical introduction for the mash-up. Selecting among them can be done at random, for example with a pair of simple coin tosses, e.g., 'heads' results in option 1 and 'tails' selects option 2. A second coin toss can be used to determine 'A' or 'B', for a given option "1" or "2."

To determine the material following the Introduction (Blocks 0-4) of the mash-up, a Rotating (or shifted) Implementation Table can be used to determine a structure that will build the second (larger) section of the mash-up comprising Blocks 5-35 shown in FIG. 8B.

Specifically, a Rotating State Implementation Table can determine which state occupies each of Blocks 5-35, according to a series of 'Left-hand' or 'Right-hand' path options for each pair of blocks, excepting Block 29 which offers only one option (vocA, vocB, instA, instB), as shown in FIG. 8B. As with FIG. 8A, each block of FIG. 8B consists of an 8-quarter-note parse.

In the embodiment of FIGS. 8A and 8B, left-hand or right-hand options only have to be decided for 13 block pairs (Blocks 5-6, 7-8, 9-10, 11-12, 13-14, 15-16, 17-18, 19-20, 21-22, 23-24, 25-26, 27-28, and 30-31). Once a left-hand or right-hand option has been selected for Blocks 30-31, the option path is determined until the end of the mash-up. For example, if the left-hand option is selected for Blocks 30-31, then Blocks 32-35 also follow the left-hand option, resulting in the textural sequence vocA-instA-instB (Blocks 30-31), vocA-instB (Blocks 32-33), instB (Block 34), and 'instB fades' (Block 35).

To determine the flow of states from Block 5-Block 35, improved chaotic mapping can operate on a list of events, e.g., 16-quarter-note parses of songB, and return j vs. g(j) values not only with respect to the x-variable, but also with respect to y- and z-variables, for a given set of initial conditions and other parameters. Then the values of j and g(j) that are found from the mapping, with respect to each variable, are noted across all 3 variables of x, y, and z, where 0 is assigned when j=g(j), and 1 is assigned when j≠g(j). Though the parses of songB will likely number more than 13, the first 13 j vs. g(j) values across all 3 variables can be used to determine the left-hand or right-hand option for the 13 blocks in question. Or, one can simply run improved chaotic mapping on a hypothetical list of 13 elements, acquiring thirteen j vs. g(j) values to be applied to the 13 block pairs, thus determining whether the left-hand or right-hand option is implemented.

In some embodiments, improved chaotic mapping determines state options for the entire mash-up, including the Introduction, for example by running the mapping on 8-quarter-note parses of songB and finding j vs. g(j) values across all 3 variables x, y, and z. Assuming songB has M 8-quarter-note parses, those M parses can be divided by 15: M/15=S, where S represents a new sampling interval applied to the M parses. Then S is truncated, thus eliminating any decimals so that only an integer remains. The M parses are divided by 15 to account for the 13 block pairs following the Introduction plus 2 additional "quasi-events" used to decide which of Options 1A, 1B, 2A, or 2B will define the Introduction, as explained shortly.

The sampling interval S can then be used to select those parses indexed by j=1, S, 2S, 3S, . . . , 12S, 13S, 14S and their associated j vs. g(j) values across all 3 variables x, y, and z. The j and g(j) values can then be converted to 0s and 1s, as explained earlier, so they form rows in an implementation table that returns either a left-hand (LH) option or right-hand (RH) option for each of 8 possible combinations of 0s and 1s, given 3 variables x, y, and z.

The State Option Implementation Table can be constructed as shown in Table 5A:

TABLE 5A

State Option Implementation Table

| State No. | X j vs g(j) | Y j vs g(j) | Z j vs g(j) | State Option Implemented |
|---|---|---|---|---|
| 1 | 0 | 1 | 0 | Left-hand option |
| 2 | 0 | 0 | 1 | Left-hand option |
| 3 | 1 | 0 | 0 | Left-hand option |
| 4 | 0 | 0 | 0 | Left-hand option |
| 5 | 0 | 1 | 1 | Right-hand option |
| 6 | 1 | 0 | 1 | Right-hand option |
| 7 | 1 | 1 | 1 | Right-hand option |
| 8 | 1 | 1 | 0 | Right-hand option |

The j vs. g(j) values for j=1 can determine the selection of a left-hand (option 1) or right-hand (option 2) track combinations for the mash-up Introduction, according to Table 5A. Similarly the j vs. g(j) values for j=S can further refine the selection to either A (left-hand option) or B (right-hand option), thus determining which of the four textural options presented by FIG. 8A is selected for the Introduction.

For example, for j=1, suppose the j vs. g(j) values yield 011. From Table 5A, 011 indicates a right-hand option. Therefore Blocks 0-4 of FIG. 8A will yield an option 2, i.e., either option 2A or 2B. To decide which, the j vs. g(j) values for j=S will select A or B. Suppose the j vs. g(j) values yield 001 for j=S. From Table 5A, 001 indicates a left-hand option, resulting in option 2A for Blocks 0-4 comprising the Introduction section of the mash-up. Then, j vs. g(j) values for j=2S through j=14S would specify left- or right-hand options for each of the 13 block pairs comprising the second section of the mash-up.

Finally, a Rotating State Option Implementation Table, such as Table 5B, can enable a different textural structure for each mash-up, i.e., a different path through FIGS. 8A and 8B for each mash-up.

Many ways exist to create different textural paths for each mash-up. These include:

1) Random. Heads or tails can determine the Introduction for Blocks 0-4, as well as Blocks 5-28. Heads or Tails could also determine left- or right-hand options for Block 29 which in turn determines the Coda for the mash-up according to whether the Left path or Right path was selected for Block 29.

2) Implementation table without rotation: achieving changes in state by virtue of the number of events in each songB. Improved chaotic mapping, with a given set of initial conditions, operating on parses of each songB will give different j vs. g(j) values across the x, y, and z variables for each songB, because each songB has a different number of parsed events. Each set of songB parsed events will divide the 0-1000 points of the trajectories differently, resulting in different-sized sampling intervals. The sampled points then undergo the j vs. g(j) comparisons across all 3 variables. These j vs. g(j) values result in a different sequence of 1s and 0s for each songB. A State Option Implementation Table, similar to Table 5A, can be constructed to determine the LH–RH options where 010, 001, 100, and 000 result in a LH option and 011, 101, 111, and 110 result in a RH option. Taking the first 15 x, y, z results and matching their 0s-1s combinations to the State Option Implementation Table, then gives a LH or RH option for each of the 15 parsed events, thus determining both the Introduction and Section 2 of the mash-up.

3) Implementation table without rotation: achieving changes in state by using different set of initial conditions for each mash-up. Improved chaotic mapping can operate on 15 parsed events with a first set of initial conditions, resulting in j vs. g(j) values across all variables. The 0s-1s combinations for each set of x, y, and z can be matched to any of 8 possible combinations comprising an Implementation Table to give a LH or RH option for each of the 15 parsed events. For the next AB2 mash-up, a different set of initial conditions can be used to give another set of j vs. g(j) values across all variables. The same Implementation Table that was used for the first set of initial conditions can be used for the second set of initial conditions, resulting in a left hand ("LH") or right hand ("RH") option for each of the 15 parsed events comprising mash-up AB2. For the next AB3 mash-up, yet another set of ICs can be chosen, and so on.

4) Rotating State Option Implementation Table. Improved chaotic mapping can operate on 15 parsed events resulting in j vs. g(j) values across all variables. Once converted into 0s and 1s, they can be used in conjunction with a Rotating State Option Implementation Table that changes for each different songB mashed with songA. Matching the 0s-1s combinations for each set of x, y, and z to the Rotating State Option Implementation Table results in a LH or RH option for each of the 15 parsed events. For the next AB2 mash-up, the table can be rotated, as shown in Table 5B.

TABLE 5B

Rotating State Option Implementation Table showing an exemplary rotation

| State No. | X j vs g(j) | Y j vs g(j) | Z j vs g(j) | State Option Implemented |
|---|---|---|---|---|
| 1 | 0 | 1 | 0 | Right-hand option |
| 2 | 0 | 0 | 1 | Left-hand option |
| 3 | 1 | 0 | 0 | Left-hand option |
| 4 | 0 | 0 | 0 | Left-hand option |
| 5 | 0 | 1 | 1 | Left-hand option |
| 6 | 1 | 0 | 1 | Right-hand option |
| 7 | 1 | 1 | 1 | Right-hand option |
| 8 | 1 | 1 | 0 | Right-hand option |

It should be noted that 1) a rotating or shifting implementation table can be implemented in many ways, e.g., using modular operations that are synonymous with rotation about a cylinder, and 2) the improved chaotic mapping with a designated variation procedure can alter any of a song's component tracks before a mash-up algorithm is applied. For example, improved chaotic mapping enables instA (instB) to vary by substituting the g(j) parse for the jth parse in each instrumental track, whenever j≠g(j) as determined by j vs. g(j) values resulting from songB (songA).

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A method of creating a novel ordered sequence of symbols, the method comprising:
A) selecting by a user of at least one seed sequence of symbols;
B) generating by a computing device of a training data set by applying at least one of a variation method and a mash-up method to the at least one seed sequence;
C) training an artificial intelligence implementation ("AI") using the training data set;
D) causing the AI to produce at least one novel output sequence of symbols that is consistent with at least one of themes, features, and patterns recognized by the AI as being recurrent in the training data; and
E) presenting the novel output sequence of symbols to a user.

2. The method of claim 1, further comprising repeating steps D) and E) after retraining the AI using a revised training data set that includes the novel output sequence of symbols.

3. The method of claim 1, further comprising applying at least one of a variation method and a mash-up method to the novel output sequence of symbols to create a modified output sequence of symbols.

4. The method of claim 3, wherein the at least one variation method and mash-up method includes at least one of a chaotic mapping method, an improved chaotic mapping method, and a chaotic mapping mash-up method.

5. The method of claim 3, further comprising repeating steps D) and E) after retraining the AI using a revised training data set that includes the modified output sequence of symbols.

6. The method of claim 1, wherein the seed sequences are musical compositions, and the novel output sequence of symbols is a novel musical composition.

7. The method of claim 1, wherein generating the training data set in step B) includes creating a mash-up by combining elements derived from at least two of the seed sequences of symbols according to the following steps:
accepting from among the seed sequences of symbols a first input designated as "songA" and at least one additional input designated as "songB";
parsing songA into a series of consecutive songA elements;
parsing each songB into a series of consecutive songB elements, wherein each songA element corresponds to a songB element;
if each of the songA elements is not equal in length to its corresponding songB element, beat-matching songB with songA by adjusting lengths of at least one of the songA elements and the songB elements so that all songB elements are equal in length to their corresponding songA elements; and
combining songA with songB, in order to create a mash-up, said combining comprising application of at least one scheme selected from the group consisting of:
(1) applying improved chaotic mapping to any components of at least one of songA and songB in order to vary the components in advance of making the mash-up;
(2) applying improved chaotic mapping to songA and songB so as to create the mash-up by replacing selected songA elements with selected songA elements, replacing songB elements with selected songB elements, then superposing the results; and
(3) applying improved chaotic mapping to songA and songB so as to create a mash-up by replacing selected songA elements with selected songB elements, replacing songB elements with selected songA elements, then superposing the results.

8. The method of claim 7, wherein songA and songB are musical compositions or recordings.

9. The method of claim 7, wherein:
songA includes a first plurality of song tracks and songB includes a second plurality of song tracks, so that each of the songA elements and songB elements comprises a plurality of song track elements, all of the song track elements within a given songA or songB element being equal to each other in length; and
applying improved chaotic mapping includes applying improved chaotic mapping separately to pairs of the song tracks, each of the pairs comprising one song track from songA and one song track from songB, so that the mash-up includes at least one song track of songA in which song track elements thereof have been replaced by song track elements from a song track of songB.

10. The method of claim 7, further comprising aligning songB with songA by performing a null period process on a selected one of the inputs, the null period process comprising at least one of:
  adding a null period to the selected input; and
  deleting a null period from the selected input.

11. The method of claim 1, wherein generating the training data set in step B) comprises applying to the seed sequences of symbols a method practiced by a computing device for automatically creating an output, referred to herein as a mash-up, by combining elements derived from the seed sequences of symbols, the method comprising:
  accepting a plurality of N inputs from among the seed sequences of symbols, the inputs being denoted as song(i) where i is an integer ranging from 1 to N, each of the song(i) comprising a plurality of song tracks;
  for each i, parsing song(i) into a series of consecutive song(i) elements;
  if all of the consecutive song(i) elements are not of equal length, adjusting the consecutive song(i) elements so that they are all of equal length, where said equal length is denoted as L(i);
  beat-matching the inputs by adjusting at least one of the L(i) such that all of the L(i) of all of the inputs are equal to the same value L;
  creating a mash-up template divided into consecutive mash-up frames of length k times L, where k is an integer, the mash-up template comprising a plurality of parallel mash-up tracks, each mash-up track being divided into a plurality of consecutive track frames of length k times L;
  creating the mash-up by sequentially introducing elements from the song tracks of the inputs into the track frames of the mash-up template, so that each successive template frame of the mash-up template is populated by a combination of corresponding elements derived from the song tracks of the inputs, where said combination of corresponding elements can be derived from any number of the song tracks from zero up to the combined total number of the song tracks of the inputs and presenting the mash-up to a user.

12. The method of claim 11, wherein the inputs are musical compositions or recordings.

13. The method of claim 11, wherein the number of mash-up tracks in the mash-up template is less than or equal to the combined total number of song tracks in the inputs.

14. The method of claim 11, wherein the mash-up frames include a beginning group thereof that are successively populated, such that each of a first group of one or more mash-up frames in the beginning group contains at least one corresponding element from only one song track, said first group being followed by a second group of one or more mash-up frames in the beginning group, each containing at least two corresponding elements from two song tracks, and so forth until at least one mash-up frame in the beginning group contains a corresponding element from each of the song tracks of the inputs.

15. The method of claim 11, wherein the combinations of corresponding elements that populate the track frames vary from mash-up frame to mash-up frame according to a specified pattern.

16. The method of claim 15, wherein the specified pattern is repeated after a specified number of frames.

17. The method of claim 11, wherein the combinations of corresponding elements that populate the track frames are determined using improved chaotic mapping, and the combinations of corresponding elements that populate the track frames are determined with reference to a Rotating State Option Implementation Table, according to a series of 'Left-hand' or 'Right-hand' path options.

18. The method of claim 11, wherein the mash-up is terminated by a terminating group of mash-up frames in which corresponding elements from the tracks of the inputs are successively eliminated until a mash-up frame in the terminating group of mash-up frames includes only one corresponding element.

19. The method of claim 11, further comprising modifying at least one of the corresponding elements before introducing it into a track frame.

20. The method of claim 1, wherein generating the training data set in step B) comprises creating a plurality of mash-ups by successively:
  accepting a plurality of N inputs from among the seed sequences of symbols, said inputs being musical compositions or recordings, the inputs being denoted as song(i) where i is an integer ranging from 1 to N, each of the song(i) comprising a plurality of song tracks;
  for each i, parsing song(i) into a series of consecutive song(i) elements;
  if all of the consecutive song(i) elements are not of equal length, adjusting the consecutive song(i) elements so that they are all of equal length, where said equal length is denoted as L(i);
  beat-matching the inputs by adjusting at least one of the L(i) such that all of the L(i) of all of the inputs are equal to the same value L;
  creating a mash-up template divided into consecutive mash-up frames of length k times L, where k is an integer, the mash-up template comprising a plurality of parallel mash-up tracks, each mash-up track being divided into a plurality of consecutive track frames of length k times L; and
  creating the mash-up by sequentially introducing elements from the song tracks of the inputs into the track frames of the mash-up template, so that each successive template frame of the mash-up template is populated by a combination of corresponding elements derived from the song tracks of the inputs, where said combination of corresponding elements can be derived from any number of the song tracks from zero up to the combined total number of the song tracks of the inputs;
  wherein the combinations of elements introduced into the mash-up template are repeated in an order that is rotated from one mash-up to the next.

* * * * *